United States Patent
Tomosugi et al.

(10) Patent No.: US 11,086,115 B2
(45) Date of Patent: Aug. 10, 2021

(54) MICROSCOPE DEVICE, VIEWING METHOD, AND CONTROL PROGRAM

(71) Applicant: NIKON CORPORATION, Tokyo (JP)

(72) Inventors: Wataru Tomosugi, Tokyo (JP); Kenji Takatsuka, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 623 days.

(21) Appl. No.: 15/715,880

(22) Filed: Sep. 26, 2017

(65) Prior Publication Data
US 2018/0017774 A1    Jan. 18, 2018

Related U.S. Application Data

(63) Continuation of application No. PCT/JP2015/059815, filed on Mar. 27, 2015.

(51) Int. Cl.
*G02B 21/00* (2006.01)
*G02B 21/06* (2006.01)
(Continued)

(52) U.S. Cl.
CPC ..... *G02B 21/0076* (2013.01); *G01N 21/6458* (2013.01); *G02B 21/06* (2013.01);
(Continued)

(58) Field of Classification Search
CPC ................. G01N 2021/1791; G01N 2021/178
See application file for complete search history.

(56) References Cited

U.S. PATENT DOCUMENTS 5,733,721 A * 3/1998 Hemstreet, III ............ G01N 33/57407
435/6.14
2005/0152029 A1   7/2005 Endo
(Continued)

FOREIGN PATENT DOCUMENTS

JP    2003-050354 A    2/2003
JP    2005-195940 A    7/2005
(Continued)

OTHER PUBLICATIONS

Oct. 26, 2018 Extended Search Report issued in European Patent Application No. 15887499.0.
(Continued)

*Primary Examiner* — David P Porta
*Assistant Examiner* — Carolyn Fin
(74) *Attorney, Agent, or Firm* — Oliff PLC

(57) ABSTRACT

A microscope apparatus includes an illumination optical system that emits activating light and exciting light, an image capturing unit that captures an image formed by an imaging optical system, an image processing unit that carries out image processing using an image capturing result from the image capturing unit, and a controller. The controller provides a plurality of image generation periods and interrupt periods; causes, in the image generation periods, the activated fluorescent material to be irradiated with the exciting light and causes the image capturing unit to capture an image of the fluorescent light from the activated fluorescent material in a plurality of frame periods; and sets an intensity of the exciting light in the interrupt periods to be lower than an intensity in the image generation periods or causes the emission of the exciting light to stop in the interrupt periods. The image processing unit generates one
(Continued)

picture image from at least some of image capturing results obtained in the plurality of frame periods.

19 Claims, 15 Drawing Sheets

(51) Int. Cl.
  *G01N 21/64* (2006.01)
  *G01N 21/17* (2006.01)
(52) U.S. Cl.
  CPC ............... *G01N 2021/178* (2013.01); *G01N 2021/1791* (2013.01)

(56) References Cited

U.S. PATENT DOCUMENTS

| | | |
|---|---|---|
| 2005/0270639 A1 | 12/2005 | Miki |
| 2008/0032414 A1 | 2/2008 | Zhuang et al. |
| 2008/0182336 A1 | 7/2008 | Zhuang et al. |
| 2012/0062722 A1 | 3/2012 | Sase |
| 2013/0300853 A1 | 11/2013 | Goodwin |
| 2020/0099916 A1* | 3/2020 | Zhuang .................. H04N 7/18 |

FOREIGN PATENT DOCUMENTS

| | | |
|---|---|---|
| JP | 2005-331887 A | 12/2005 |
| JP | 2010-500563 A | 1/2010 |
| JP | 2013-020204 A | 1/2013 |
| JP | 5392406 B2 | 1/2014 |
| WO | 2012/096619 A1 | 7/2012 |

OTHER PUBLICATIONS

Lakadamyali, Melike et al., "3D Multicolor Super-Resolution Imaging Offers Improved Accuracy in Neuron Tracing", vol. 7, pp. 1-10, 2012, www.plosone.org.
Jun. 19, 2018 Office Action issued in Japanese Application No. 2017-508872.
Mar. 12, 2019 Office Action issued in Japanese Application No. 2017-508872.
Human translation of Jun. 19, 2018 Office Action issued in Japanese Application No. 2017-508872.
Human translation of Mar. 12, 2019 Office Action issued in Japanese Application No. 2017-508872.
Jun. 16, 2015 International Search Report issued in International Patent Application No. PCT/JP2015/059815.
Jun. 16, 2015 Written Opinion issued in International Patent Application No. PCT/JP2015/059815.
Sep. 3, 2020 Office Action issued in European Patent Application No. 15887499.0.

* cited by examiner

MICROSCOPE DEVICE, VIEWING METHOD, AND CONTROL PROGRAM

CROSS REFERENCE TO RELATED APPLICATION

This is a Continuation of PCT Application No. PCT/JP2015/059815, filed on Mar. 27, 2015. The contents of the above-mentioned application are incorporated herein by reference.

FIELD OF THE INVENTION

The present invention relates to a microscope apparatus, an observation method, and a storage medium.

BACKGROUND

Single-molecule Localization Microscopy is known as a super-resolution microscopy technique. There are, for example, microscope apparatuses that use stochastic optical reconstruction microscopy (called "STORM" hereinafter) (see Patent Literature 1, for example). STORM is used to observe samples to which a fluorescent material has been applied. The fluorescent material is, for example, activated upon being irradiated with activating light, and then either emits fluorescence or is deactivated upon being irradiated with exciting light while activated. STORM obtains a fluorescent picture image in which images of the fluorescent material are distributed sparsely by, for example, activating the fluorescent material at low density and causing the fluorescent material to emit light by irradiating only the activated fluorescent material with the exciting light. In the fluorescent picture image, the individual images of the fluorescent material are separated, which makes it possible to find center-of-gravity positions of the individual images. STORM generates (constructs) a high-resolution picture image by arranging the respective images at the center-of-gravity positions of numerous fluorescent materials obtained from numerous fluorescent picture images.

CITATION LIST

Patent Literature

Patent Literature 1: U.S. Patent Application Publication No. 2008/0182336

The above-described STORM obtains numerous fluorescent picture images through continuous irradiation with activating light and high-intensity exciting light, for example, and thus damages the sample. In a case where the sample contains live cells, for example, such continuous irradiation with high-intensity exciting light may cause damage to build up, killing the cells and rendering the desired observation impossible. Having been conceived in light of the above-described circumstances, an object of the present invention is to provide a microscope apparatus, an observation method, and a control program capable of suppressing the buildup of damage in a sample.

SUMMARY

According to a first aspect of the present invention, provided is a microscope apparatus including: an illumination optical system configured to emit activating light that activates a fluorescent material contained in a sample and exciting light that excites the activated fluorescent material; an imaging optical system configured to form an image of fluorescent light from the fluorescent material; an image capturing unit configured to capture the image formed by the imaging optical system; an image processing unit configured to carry out image processing using an image capturing result from the image capturing unit; and a controller. The controller is configured to: provide a plurality of image generation periods and interrupt periods; cause, in the image generation periods, the activated fluorescent material to be irradiated with the exciting light and cause the image capturing unit to capture the image of the fluorescent light from the activated fluorescent material in a plurality of frame periods; and set an intensity of the exciting light in the interrupt periods to be lower than an intensity in the image generation periods or causing the emission of the exciting light to stop in the interrupt periods. The image processing unit is configured to generate one picture image from at least some of image capturing results obtained in the plurality of frame periods.

According to a second aspect of the present invention, provided is an observation method including: emitting activating light that activates a fluorescent material contained in a sample and exciting light that excites the activated fluorescent material; forming an image of fluorescent light from the fluorescent material; capturing the image formed by an imaging optical system; carrying out image processing using a result of the capturing; providing a plurality of image generation periods and interrupt periods; causing, in the image generation periods, the activated fluorescent material to be irradiated with the exciting light and causing the image of the fluorescent light from the activated fluorescent material to be captured in a plurality of frame periods; and setting an intensity of the exciting light in the interrupt periods to be lower than an intensity in the image generation periods or causing the emission of the exciting light to stop in the interrupt periods. The image processing includes generating one picture image from at least some of image capturing results obtained in the plurality of frame periods.

According to a third aspect of the present invention, provided is a control program causing a computer to execute control of a microscope apparatus configured to emit activating light that activates a fluorescent material contained in a sample and exciting light that excites the activated fluorescent material, capture an image of fluorescent light from the fluorescent material, and carry out image processing using a result of the capturing. The control includes: providing a plurality of image generation periods and interrupt periods; causing, in the image generation periods, the activated fluorescent material to be irradiated with the exciting light and causing the image of the fluorescent light from the activated fluorescent material to be captured in a plurality of frame periods; and setting an intensity of the exciting light in the interrupt periods to be lower than an intensity in the image generation periods or causing the emission of the exciting light to stop in the interrupt periods. The image processing includes generating one picture image from at least some of image capturing results obtained in the plurality of frame periods.

According to the present invention, a microscope apparatus, an observation method, and a control program capable of suppressing the buildup of damage in a sample can be provided.

DETAILED DESCRIPTION OF EMBODIMENTS

Embodiments will now be described. A microscope apparatus according to embodiments is, for example, a microscope apparatus using Single-molecule Localization Microscopy such as STORM or PALM.

The microscope apparatus according to the embodiments can be used both in fluorescent observation of a sample labeled with a single type of fluorescent material and in fluorescent observation of a sample labeled with two or more types of fluorescent materials. Furthermore, the microscope apparatus according to the embodiments has a mode for generating a two-dimensional super-resolution image and a mode for generating a three-dimensional super-resolution image, and can switch between the two modes. The following will mainly describe the mode for generating a two-dimensional super-resolution image, after which the mode for generating a three-dimensional super-resolution image will be described.

The sample may contain live cells or cells fixed using a tissue fixing liquid such as a formaldehyde solution, or may be tissue or the like. The fluorescent material may be a fluorescent dye such as cyanine dye, or may be a fluorescent protein. The fluorescent dye contains a reporter dye that emits fluorescent light upon receiving exciting light while in a state of activation (called an "activated condition" hereinafter). The fluorescent dye may also contain an activator dye that puts the reporter dye in the activated condition upon receiving activating light. In a case where the fluorescent dye does not contain an activator dye, the reporter dye enters the activated condition upon receiving activating light. The fluorescent dye is, for example, a dye pair in which two types of cyanine dyes are conjugated (for example, a Cy3-Cy5 dye pair, a Cy2-Cy5 dye pair, or a Cy3-AleXa Fluor 647 dye pair (AleXa Fluor is a registered trademark)), or a single type of dye (for example, AleXa Fluor 647 (AleXa Fluor is a registered trademark)). The fluorescent protein is PA-GFP, Dronpa, or the like, for example.

Figure 1:
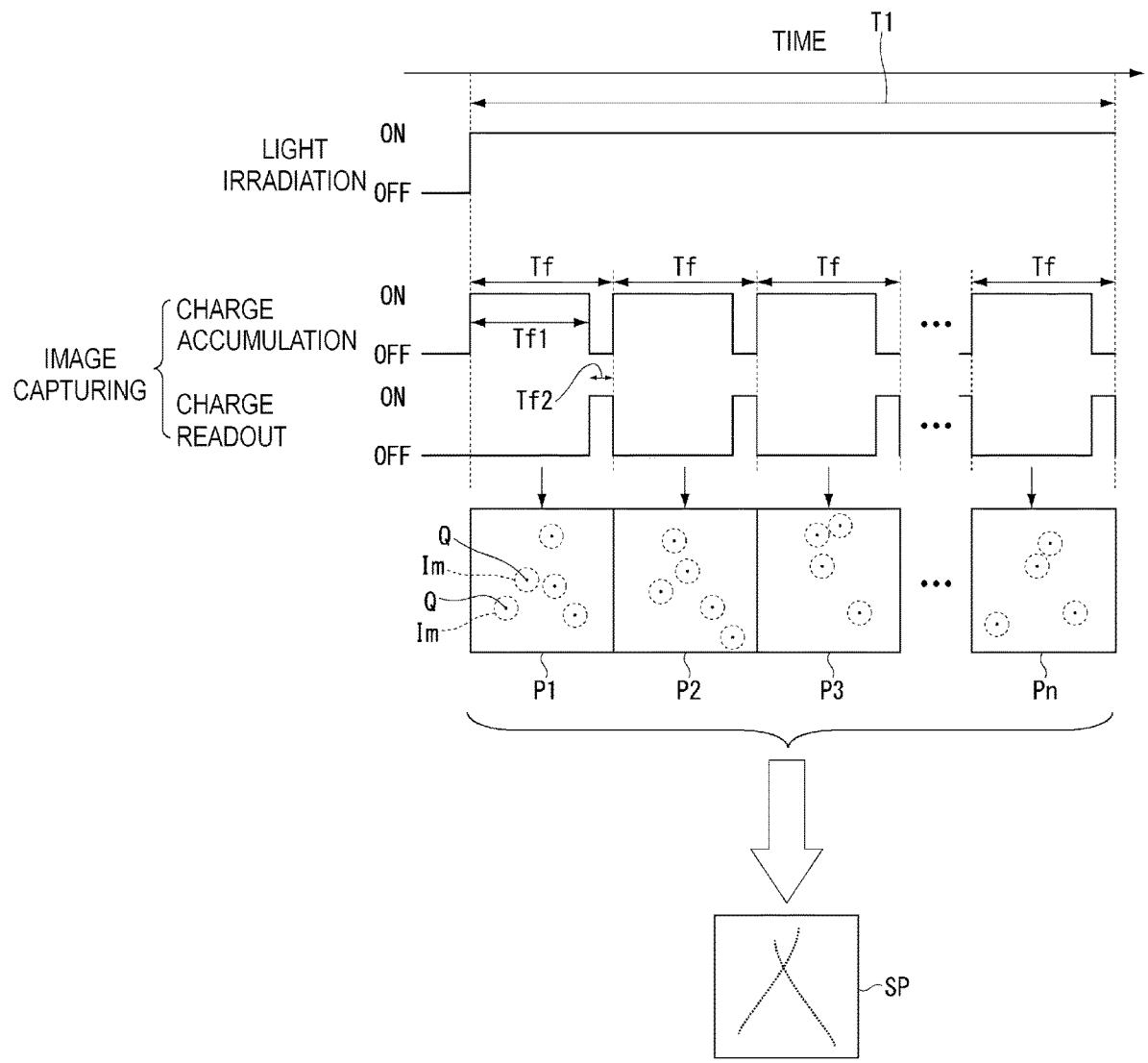
FIG. 1 is a schematic diagram illustrating operations of a microscope apparatus according to embodiments.

First, an overview of operations of the microscope apparatus according to the embodiments will be given. FIG. 1 is a schematic diagram illustrating operations of the microscope apparatus according to the embodiments. The microscope apparatus irradiates an activated fluorescent material with exciting light (light irradiation: ON in FIG. 1), and captures an image of a sample in each of a plurality of frame periods Tf. Note that the fluorescent material is stochastically activated. Each frame period Tf is a period in which one capture image is generated. Each frame period Tf includes, for example, a period Tf1 in which a charge is accumulated and a period Tf2 in which the charge accumulated in period Tf1 is read out. In a case where charge accumulation and charge readout are carried out in parallel, the frame period Tf becomes a period Tf1 in which a charge corresponding to fluorescent light is accumulated. The length of each frame period Tf is the inverse of a framerate, for example. The microscope apparatus generates capture images P1 to Pn as image capturing results from respective frame periods Tf. Fluorescent light images Im are distributed discretely at low density throughout each of the capture images P1 to Pn. The microscope apparatus calculates information on positions (for example, center-of-gravity positions Q) of the fluorescent light images Im by, for example, using a Gaussian function to fit an optical intensity distribution of the fluorescent light images Im.

The microscope apparatus generates (constructs) one picture image SP from numerous center-of-gravity positions Q obtained from the plurality of capture images P1 to Pn, for example. The picture image SP is a super-resolution image according to STORM, PALM, or the like, for example. The number of capture images P1 to Pn used to generate the picture image SP is a set value such as a pre-set default value or a value specified by a user, for example. A picture image generation period T1 is a period in which a predetermined number of capture images P1 to Pn are obtained and which includes the plurality of frame periods Tf, for example. As illustrated in FIG. 1, the exciting light is continuously emitted in the picture image generation period T1.

The microscope apparatus can capture images in a plurality of picture image generation periods T1 to generate a plurality of picture images SP. For example, although a plurality of picture images SP can be used individually as a super-resolution image, a super-resolution image with a greater amount of information than one picture image SP can be obtained by merging the plurality of picture images SP. In addition, consecutive reproduction of the plurality of picture images SP can create a moving picture.

Figure 2A:
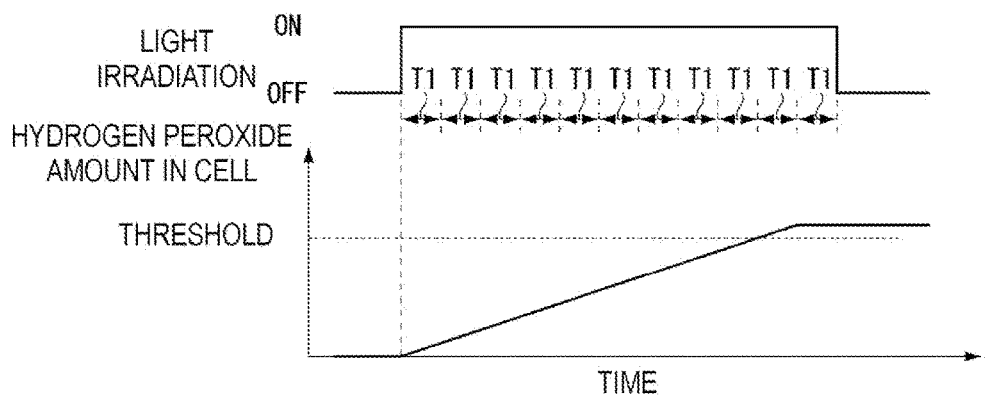
FIGS. 2A to 2C are conceptual diagrams illustrating changes over time in the amount of hydrogen peroxide within a cell.
Figure 2B:
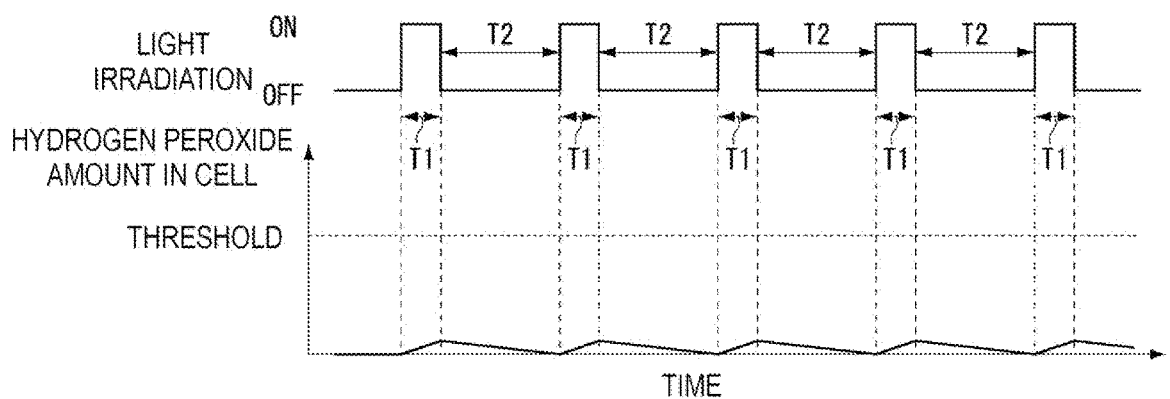
Figure 2C:
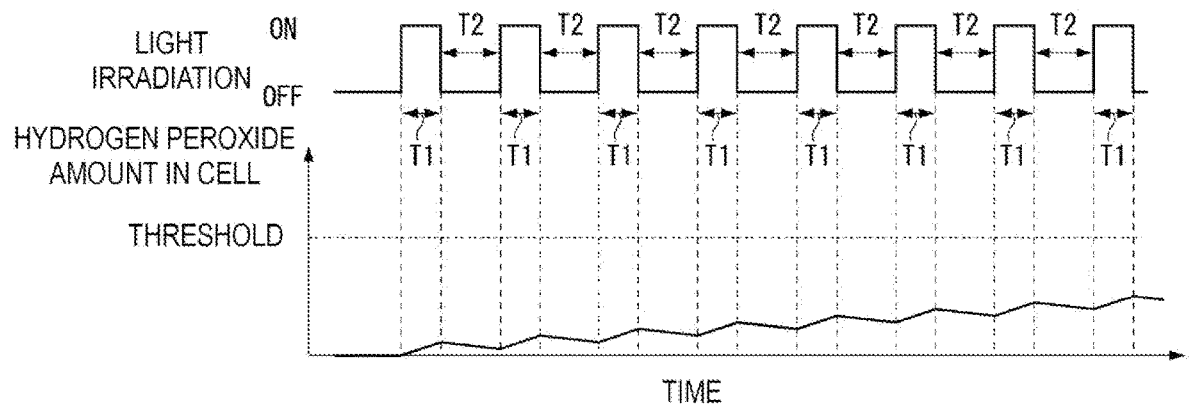

FIGS. 2A to 2C are conceptual diagrams illustrating a change over time in the amount of hydrogen peroxide within a cell in a case where images of a sample containing living cells are captured in a plurality of picture image generation periods T1. FIG. 2A is a diagram illustrating the amount of hydrogen peroxide within a cell in a case where images are captured consecutively in a plurality of picture image generation periods T1. In this case, the plurality of picture image generation periods T1 are consecutive and thus light is emitted continuously (light irradiation: ON) throughout the plurality of picture image generation periods T1. When cells are irradiated with high-optical intensity light such as exciting light, active oxygen, for example, is produced within the cells and in the environment outside the cells. Note that the optical intensity of the activating light is low enough to be ignored with respect to the generation of hydrogen peroxide. Active oxygen reacts with water molecules to produce hydrogen peroxide, for example, which damages the cells. In a case where light irradiation is carried out continuously, catalase will be added to the solution in the environment outside the cells, which enables decomposition of the produced hydrogen peroxide. However, within the cells, the hydrogen peroxide will accumulate and the amount of hydrogen peroxide within the cells will rise as time passes. For example, if a cell is irradiated with exciting light continuously for several minutes (3 to 5 minutes, for example), the amount of hydrogen peroxide will exceed a threshold, which kills the cell.

Focusing on a fact that living cells are capable of decomposing (detoxicating) hydrogen peroxide, the inventors of the present invention concluded that the total quantity of light (a product of light intensity and irradiation time) a cell can be irradiated with before being killed can be increased, that cells can be irradiated without being killed, and the like by using that decomposition function. For example, an enzyme called catalase is present within peroxisomes, namely organelles within cells. Even within the cells, however, the amount of catalase is extremely low outside the peroxisomes. Thus, a large amount of hydrogen peroxide is produced when a cell is irradiated with high-optical intensity light such as exciting light, and the hydrogen peroxide cannot be decomposed (detoxicated) quickly enough outside the peroxisomes. The inventors of the present invention concluded that interrupting the light irradiation suppresses the production of active oxygen, decreases the accumulated hydrogen peroxide through decomposition, and increases time for which observation can be carried out.

FIG. 2B is a diagram illustrating the amount of hydrogen peroxide within a cell in a case where an interrupt period T2 (recovery period, decomposition period, non-picture image generation period), in which neither the activating light nor the exciting light is emitted, is provided after the picture image generation period T1. In FIG. 2B, the length of the interrupt period T2 is set to a time in which almost all of the hydrogen peroxide that has accumulated within the cell in the picture image generation period T1 is decomposed. In this case, the amount of hydrogen peroxide within the cell at the end of the interrupt period T2 is the same as the amount of hydrogen peroxide within the cell at the beginning of the picture image generation period T1, and thus the cell can be irradiated with light without being killed by repeating the picture image generation period T1 and the interrupt period T2 in an alternating manner.

FIG. 2C is a diagram illustrating another example of the amount of hydrogen peroxide within a cell in the case where the interrupt period T2 is provided after the picture image generation period T1. In FIG. 2C, the length of the interrupt period T2 is set to a time in which some of the hydrogen peroxide that has accumulated within the cell in the picture image generation period T1 is decomposed. In this case, an increase in the amount of hydrogen peroxide within the cell in a set of the picture image generation period T1 and the interrupt period T2 is lower than the increase in the amount of hydrogen peroxide within the cell in one picture image generation period T1. Accordingly, the number of picture image generation periods T1 until the amount of hydrogen peroxide in the cell reaches a threshold in the case where a set of the picture image generation period T1 and the interrupt period T2 is provided repeatedly is greater than the number of the picture image generation periods T1 until the amount of hydrogen peroxide in the cell reaches the threshold in the case where only the picture image generation periods T1 are provided consecutively. The total quantity of light (a product of light intensity and irradiation time) a cell can be irradiated with before being killed can thus be increased, which makes it possible to obtain a greater amount of information. For example, assume the amount of hydrogen peroxide within the cell that increases in the picture image generation period T1 is represented by U1 and the amount of hydrogen peroxide within the cell that decreases in the interrupt period T2 is represented by U2. The increase in the amount of hydrogen peroxide within the cell will be U1-U2 in the case where one picture image generation period T1 and one interrupt period are provided. The number of picture image generation periods T1 at a predetermined light intensity that can be provided (that is, the quantity of light) without the cell being killed is Q/U1 times in the case where only the picture image generation periods T1 are provided, but is Q/(U1−U2) in the case where the interrupt periods T2 are provided, which is larger than the case where only the picture image generation periods T1 are provided. Assuming, for example, U2=U1/2, in the case where the interrupt periods T2 are provided, the number of picture image generation periods T1 (the quantity of light) that can be provided without the cell being killed is 2Q/U1, which is double the number in the case where the U1 interrupt period T2 is not provided.

Although FIGS. 2B and 2C illustrate a case where neither the activating light nor the exciting light is emitted in the interrupt periods T2 as an example, the activating light and the exciting light may be reduced rather than the emission thereof being stopped. This is because reducing the activating light and the exciting light rather than stopping the emission thereof also suppresses the production of active oxygen, decreases the accumulated hydrogen peroxide through decomposition, and increases time for which observation can be carried out. The same applies to the descriptions given below. Furthermore, although FIGS. 2A, 2B, and 2C illustrate cases where the activating light and the exciting light are emitted, the optical intensity of the activating light is low enough to be ignored with respect to the generation of hydrogen peroxide. However, the exciting light has a high optical intensity, and thus continued irradiation therewith will cause the amount of hydrogen peroxide within cells to rise over time, as described above. In other words, providing the interrupt period stops or reduces the high-intensity exciting light as illustrated in FIGS. 2B and 2C, which makes it possible to increase the total quantity of light (the product of light intensity and irradiation time) the cells can be irradiated with without being killed as described above. The same applies to the descriptions given below.

Note that a plurality of the picture image generation periods T1 can be provided consecutively in the microscope apparatus according to the embodiments as illustrated in FIG. 2A. For example, the microscope apparatus according to the embodiments can operate according to the irradiation and image capturing sequence illustrated in FIG. 2A when observing fixed cells or tissue, live cells or tissue, and the like. The microscope apparatus according to the present embodiment can switch between providing and not providing the interrupt period T2 in response to user instructions, for example.

First Embodiment

Figure 3:
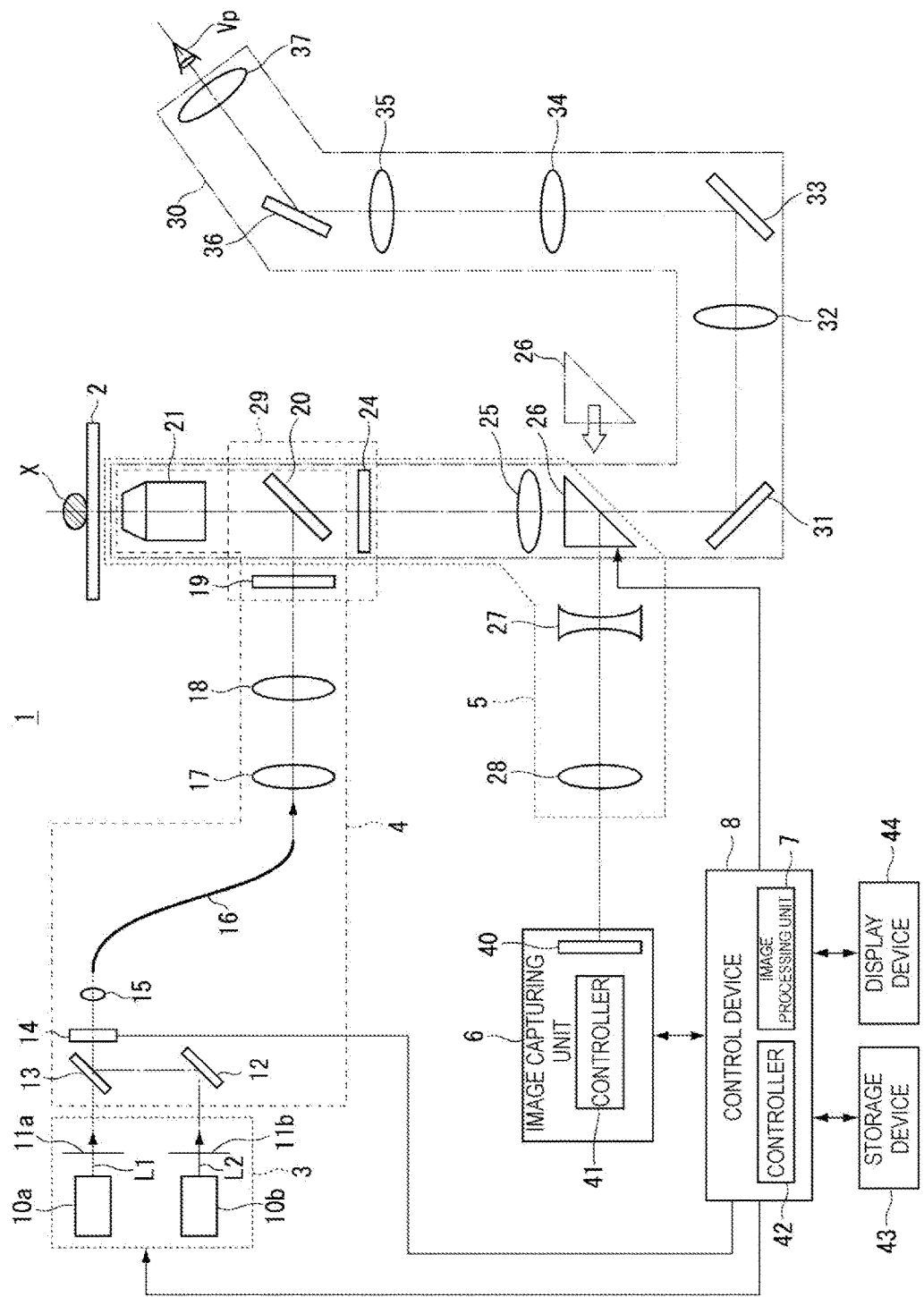
FIG. 3 is a diagram illustrating a microscope apparatus according to a first embodiment.

A first embodiment will now be described. The present embodiment describes an aspect in which a single type of fluorescent dye (for example, a reporter dye) is used as a label. FIG. 3 is a diagram illustrating a microscope apparatus 1 according to the present embodiment. The microscope apparatus 1 includes a stage 2, a light source device 3, an illumination optical system 4, an imaging optical system 5, an image capturing unit 6, an image processing unit 7, and a control device 8. The control device 8 includes a controller 42 that collectively controls the various units of the microscope apparatus 1.

The stage 2 holds a sample X to be observed. The stage 2 is capable of having the sample X placed on a top surface thereof, for example. The stage 2 may have no mechanism for moving the sample X, such as a desk, for example, or may have a mechanism for moving the sample X, such as an XY stage. The microscope apparatus 1 need not include the stage 2.

The light source device 3 includes an activating light source 10a, an exciting light source 10b, a shutter 11a, and a shutter 11b. The activating light source 10a emits activating light L1 that activates a fluorescent material contained in the sample X. Here, it is assumed that the fluorescent material contains a reporter dye but does not contain an activator dye. Upon being irradiated with the activating light L1, the reporter dye in the fluorescent material enters the activated condition in which fluorescent light can be emitted. The fluorescent material may instead contain both a reporter dye and an activator dye, and in such a case, the activator dye activates the reporter dye upon exposing to the activating light L1. The fluorescent material may be a fluorescent protein such as PA-GFP, or Dronpa, for example.

The exciting light source 10b emits exciting light L2 that excites the fluorescent material contained in the sample X. Upon being irradiated with the exciting light L2 while in the activated condition, the fluorescent material either emits fluorescent light or is deactivated. Upon being irradiated with the activating light L1 while in a state of deactivation (called a "deactivated condition" hereinafter), the fluorescent material once again enters the activated condition.

The activating light source 10a and the exciting light source 10b include solid-state light sources such as laser light sources, for example, and each light source emits laser light at a wavelength depending on the type of the fluorescent material. The wavelengths of the light emitted by the activating light source 10a and the exciting light source 10b are selected from among approximately 405 nm, approximately 457 nm, approximately 488 nm, approximately 532 nm, approximately 561 nm, approximately 640 nm, approximately 647 nm, and the like, for example. Here, it is assumed that the wavelength of the light emitted by the activating light source 10a is approximately 405 nm and the wavelength of the light emitted by the exciting light source 10b is selected from approximately 488 nm, approximately 561 nm, and approximately 647 nm.

Under the control of the controller 42, the shutter 11a can switch between a state of allowing the activating light L1 from the activating light source 10a to pass therethrough and a state of blocking the activating light L1. Under the control of the controller 42, the shutter 11b can switch between a state of allowing the exciting light L2 from the exciting light source 10b to pass therethrough and a state of blocking the exciting light L2.

It is sufficient for the microscope apparatus 1 to include only part of the light source device 3. For example, the light source device 3 may be unitized, and provided in the microscope apparatus 1 so as to be exchangeable (attachable and detachable). Thus, the light source device 3 may be attached to the microscope apparatus 1 for observation with the microscope apparatus 1, for example.

The illumination optical system 4 irradiates the sample X with the activating light L1 and the exciting light L2. The illumination optical system 4 includes a mirror 12, a dichroic mirror 13, an acousto-optic element 14, a lens 15, a light guide member 16, a lens 17, a lens 18, a filter 19, a dichroic mirror 20, and an objective lens 21. The mirror 12 is provided on a light exit side of the exciting light source 10b, for example. The exciting light L2 from the exciting light source 10b is reflected by the mirror 12 and enters the dichroic mirror 13. The dichroic mirror 13 is provided on a light exit side of the activating light source 10a, for example. The dichroic mirror 13 has a characteristic of allowing the activating light L1 to pass therethrough, but reflecting the exciting light L2. The activating light L1 passing through the dichroic mirror 13 and the exciting light L2 reflected by the dichroic mirror 13 enter the acousto-optic element 14 along the same optical path. The acousto-optic element 14 is an acousto-optic filter, for example.

Under the control of the controller 42, the acousto-optic element 14 can adjust an optical intensity of the activating light L1 and an optical intensity of the exciting light L2. Additionally, under the control of the controller 42, the acousto-optic element 14 can, for both the activating light L1 and the exciting light L2, switch between a state of allowing the light to pass through the acousto-optic element 14 (called a "light-passing state" hereinafter) and a state in which the light is blocked or reduced in intensity by the acousto-optic element 14 (called a "light-blocking state" hereinafter). For example, in the case where the fluorescent material contains a reporter dye but does not contain an activator dye, the controller 42 controls the acousto-optic element 14 so that the activating light L1 and the exciting light L2 are emitted in parallel. In the case where the fluorescent material contains a reporter dye and an activator dye, the controller 42 controls the acousto-optic element 14 so that the exciting light L2 is emitted after the activating light L1 is emitted, for example.

The lens 15 is a coupler, for example, and condenses the activating light L1 and the exciting light L2 from the acousto-optic element 14 onto the light guide member 16. The light guide member 16 is an optical fiber, for example, and guides the activating light L1 and the exciting light L2 to the lens 17. The lens 17 is a collimator, for example, and converts the activating light L1 and the exciting light L2 into collimated light. The lens 18 condenses the activating light L1 and the exciting light L2 onto the position of a pupil plane of the objective lens 21, for example. The filter 19 has a characteristic of, for example, allowing the activating light L1 and the exciting light L2 to pass therethrough while blocking at least some light of different wavelengths. The dichroic mirror 20 has a characteristic of reflecting the activating light L1 and the exciting light L2 but allowing part of the light from the sample X, in a predetermined wavelength band (fluorescent light, for example) to pass therethrough. Light from the filter 19 is reflected by the dichroic mirror 20 and enters the objective lens 21. The sample X is arranged on a focal plane of the objective lens 21 during observation.

The sample X is irradiated with the activating light L1 and the exciting light L2 through the illumination optical system 4, as described above. Note that the above-described illumination optical system 4 is an example and can be changed as appropriate. For example, part of the above-described illumination optical system 4 may be omitted. Additionally, the illumination optical system 4 may include at least part of the light source device 3. The illumination optical system 4 may further include an aperture diaphragm, an illumination field diaphragm, and the like.

The imaging optical system 5 forms an image of fluorescent light from the fluorescent material contained in the sample X. The imaging optical system 5 includes the objective lens 21, the dichroic mirror 20, a filter 24, a lens 25, an optical path switching member 26, a lens 27, and a lens 28. The imaging optical system 5 shares the objective lens 21 and the dichroic mirror 20 with the illumination optical system 4. The light from the sample X travels through the objective lens 21 and the dichroic mirror 20 and enters the filter 24. The filter 24 has a characteristic of selectively allowing some of the light from the sample X, in a predetermined wavelength band to pass therethrough. The filter 24 blocks illumination light reflected by the sample X, external light, stray light, and the like, for example. The filter 24 may be unitized with the filter 19 and the dichroic mirror 20, for example, and the resulting filter unit 29 may be provided so as to be exchangeable. The filter unit 29 is exchanged depending on, for example, the wavelength of light to be emitted from the light source device 3 (for example, the wavelength of the activating light L1 and the wavelength of the exciting light L2), the wavelength of the fluorescent light radiated from the sample X, and the like.

The light that has passed through the filter 24 enters the optical path switching member 26 through the lens 25. The optical path switching member 26 is a prism, for example, and is provided so as to be insertable into and retractable from the optical path of the imaging optical system 5. The optical path switching member 26 is inserted into or retracted from the optical path of the imaging optical system 5 by a driving unit (not illustrated) controlled by the controller 42, for example. While inserted into the optical path of the imaging optical system 5, the optical path switching member 26 guides the fluorescent light from the sample X to an optical path leading to the image capturing unit 6 through internal reflection. The lens 27 and the lens 28 constitute an afocal optical system, for example.

The imaging optical system 5 as described above forms an image of the fluorescent light in a position optically conjugate with the sample X. The above-described imaging optical system 5 is an example and can be changed as appropriate. For example, part of the above-described imaging optical system 5 may be omitted. The imaging optical system 5 may further include an aperture diaphragm, a field diaphragm, and the like.

The microscope apparatus 1 according to the present embodiment includes an observation optical system 30 used to set an observation range and the like. The observation optical system 30 includes the objective lens 21, the dichroic mirror 20, the filter 24, the lens 25, a mirror 31, a lens 32, a mirror 33, a lens 34, a lens 35, a mirror 36, and a lens 37, in that order from the sample X toward a viewpoint Vp of an observer. The observation optical system 30 shares the elements from the objective lens 21 to the lens 25 with the imaging optical system 5. Light from the sample X passes through the lens 25 and then enters the mirror 31 while the optical path switching member 26 is retracted from the optical path of the imaging optical system 5. The light reflected by the mirror 31 enters the mirror 33 through the lens 32, is reflected by the mirror 33, and then enters mirror 36 through the lens 34 and the lens 35. The light reflected by the mirror 36 enters the viewpoint Vp through the lens 37. The observation optical system 30 forms an intermediate image of the sample X in the optical path between the lens 35 and the lens 37, for example. The lens 37 is an ocular lens, for example, and the observer can set the observation range and the like by observing the intermediate image.

The image capturing unit 6 captures the image formed by the imaging optical system 5. The image capturing unit 6 includes an image capturing element 40 and a controller 41. The image capturing element 40 is a CMOS image sensor, for example, but a different image sensor such as a CCD image sensor may be used. The image capturing element 40 has, for example, a plurality of pixels arranged two-dimensionally, with a structure in which a photoelectric converting element such as a photodiode is provided for each pixel. The image capturing element 40 reads out charges accumulated in the photoelectric converting elements through a readout circuit, for example. The image capturing element 40 converts the read-out charges into digital data, and outputs digital-format data in which pixel positions are associated with gradient values. The controller 41 causes the image capturing element 40 to operate in accordance with control signals inputted from the controller 42 of the control device 8, and outputs captured image data to the control device 8. Additionally, the controller 41 outputs a charge accumulation period and a charge readout period to the control device 8.

The control device 8 collectively controls the various units of the microscope apparatus 1. The control device 8 includes the controller 42 and the image processing unit 7. In accordance with a signal indicating the charge accumulation period and the charge readout period supplied from the controller 41 (that is, image capturing timing information), the controller 42 supplies, to the acousto-optic element 14, a control signal for switching between the light-passing state in which light from the light source device 3 is allowed to pass therethrough and the light-blocking state in which light from the light source device 3 is blocked. The acousto-optic element 14 switches between the light-passing state and the light-blocking state in accordance with this control signal. The controller 42 controls the acousto-optic element 14 so as to control a period in which the sample X is irradiated with the activating light L1 and a period in which the sample X is not irradiated with the activating light L1. The controller 42 also controls the acousto-optic element 14 so as to control a period in which the sample X is irradiated with the exciting light L2 and a period in which the sample X is not irradiated with the exciting light L2. The controller 42 controls the acousto-optic element 14 so as to control the optical intensity of the activating light L1 and the optical intensity of the exciting light L2 with which the sample X is irradiated. The controller 42 controls the image capturing unit 6 to cause the image capturing element 40 to capture images. Note that instead of the controller 42, the controller 41 may supply the control signal to the acousto-optic element 14 for switching between the light-blocking state and the light-passing state in accordance with the signal indicating the charge accumulation period and the charge readout period (the image capturing timing information) to control the acousto-optic element 14. An illumination and image capturing sequence controlled by the controller 42 will be described below with reference to FIGS. 4A and 4B and the like. The controller 42 obtains an image capturing result (data of a captured image) from the image capturing unit 6. With the image capturing result from the image capturing unit 6, the image processing unit 7 carries out image processing such as finding center-of-gravity positions of individual images. As illustrated in FIG. 1, the image processing unit 7 generates, for example, one picture image SP (a super-resolution image, for example) by expressing the center-of-gravity positions of a plurality of fluorescent light images in captured images P1 to Pn obtained in a plurality of frame periods Tf as bright spots and superimposing (merging) at least some of the plurality of bright spots.

The control device 8 is communicably connected to both a storage device (storage unit) 43 and a display device (display unit) 44. The display device 44 is a liquid crystal display, for example. The display device 44 displays various types of images, such as images indicating various types of settings of the microscope apparatus 1, images captured by the image capturing unit 6, and picture images generated from the captured images, for example. The controller 42 controls the display device 44 to display the various types of images in the display device 44. For example, the controller 42 supplies the data of a picture image generated by the image processing unit 7 (a super-resolution image such as a STORM image or a PALM image, for example) to the display device 44 to cause the display device 44 to display that picture image. For example, the microscope apparatus 1 can also display a super-resolution image of the sample X to be observed as a live image. The storage device 43 is, for example, a magnetic disk or an optical disc, and stores various types of data such as data of various types of settings of the microscope apparatus 1, data of images captured by the image capturing unit 6, and data of picture images generated by the image processing unit 7. The controller 42 can supply the data of a super-resolution image stored in the storage device 43 to the display device 44 to cause the display device 44 to display that super-resolution image, for example. The controller 42 controls the storage device 43 so as to cause the various types of data to be stored in the storage device 43.

Figure 4A:
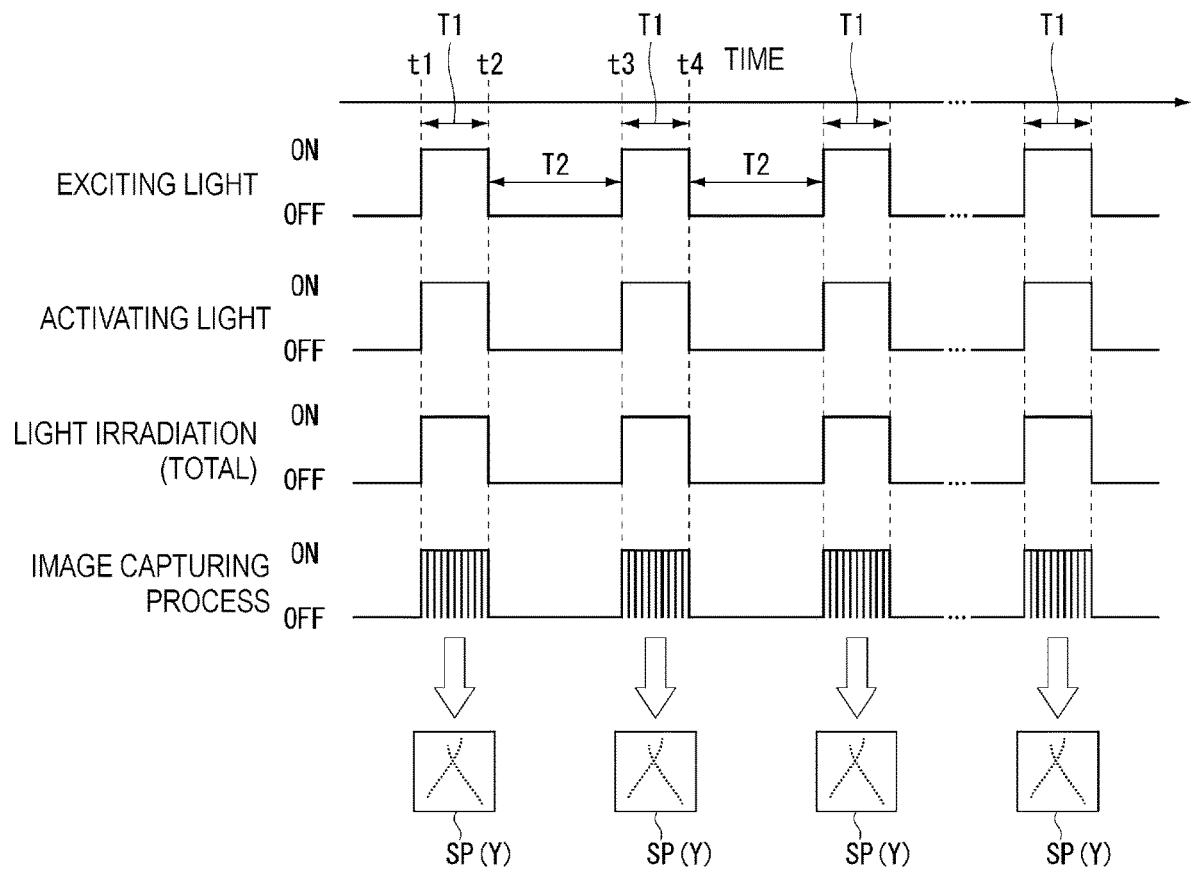
FIGS. 4A and 4B are diagrams illustrating a sequence of illumination and image capturing according to the first embodiment.
Figure 4B:
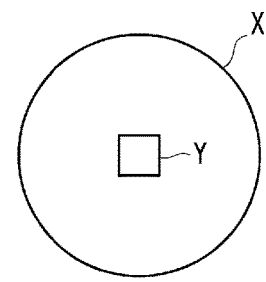

In a case where a view field for observing the sample X is fixed, FIG. 4A is a conceptual diagram illustrating a sequence of illumination and image capturing according to the present embodiment and FIG. 4B is a diagram illustrating a view field Y. In the picture image generation period T1, the controller 42 irradiates the view field Y on the sample X with at least one of the activating light L1 and the exciting light L2. The view field Y is, for example, a region optically conjugate with a light-receiving surface of the image capturing element 40 in the image capturing unit 6, and is located on part of the sample X. For example, the controller 42 starts the emission of the activating light L1 at time t1 (activating light: ON), and causes the activating light L1 to be emitted throughout a period from time t1 to time t2. Additionally, the controller 42 starts the emission of the exciting light L2 at time t1 (exciting light: ON), and causes the exciting light L2 to be emitted throughout the period from time t1 to time t2. "Light irradiation (total)" in FIG. 4A represents a state where at least one of the activating light and the exciting light is being emitted as "ON" and a state in which neither the activating light nor the exciting light is being emitted as "OFF". The controller 42 causes the image capturing unit 6 to capture images in a plurality of frame periods Tf (see FIG. 1) throughout the picture image generation period T1. The image processing unit 7 generates one picture image SP from at least some of the image capturing results from the plurality of frame periods Tf in the picture image generation period T1 spanning from time t1 to time t2.

The controller 42 stops the emission of the activating light L1 and the exciting light L2 in the interrupt period T2 following the picture image generation period T1, or makes the optical intensity of the activating light L1 and exciting light L2 weaker (lower) in the interrupt period T2 than in the picture image generation period T1. For example, the controller 42 stops the emission of the activating light L1 at time t2 (activating light OFF), and keeps the emission of the activating light L1 stopped throughout a period from time t2 to time t3. The controller 42 stops the emission of the exciting light L2 at time t2 (exciting light OFF), and keeps the emission of the exciting light L2 stopped throughout a period from time t2 to time t3. In this case, the interrupt period T2, in which the view field Y on the sample X is irradiated with neither the activating light L1 nor the exciting light L2, is a period spanning from time t2 to time t3. The interrupt period T2 is longer than any of the plurality of frame periods Tf (see FIG. 1), for example. The interrupt period T2 may be longer or shorter than the picture image generation period T1.

The controller 42 alternately carries out the picture image generation period T1 and the interrupt period T2. For example, the controller 42 carries out a picture image generation period T1 spanning from time t3 to time t4 following the interrupt period T2 spanning from time t2 to time t3. In the picture image generation period T1 spanning from time t3 to time t4, the controller 42 irradiates the same view field Y on the sample X with the activating light L1 and the exciting light L2 as the view field Y irradiated in the picture image generation period T1 spanning from time t1 to time t2. In the picture image generation period T1 spanning from time t3 to time t4, the controller 42 causes an image to be captured of the same view field Y on the sample X as the view field Y captured in the picture image generation period T1 spanning from time t1 to time t2. The image processing unit 7 generates one picture image SP from at least some of the image capturing results from the plurality of frame periods Tf in the picture image generation period T1 spanning from time t3 to time t4. As a result, the controller 42 causes the view field Y on the sample X to be irradiated with the activating light L1 and the exciting light L2 and causes an image of the view field Y on the sample X to be captured, in the picture image generation periods T1 before and after the interrupt period T2. The image processing unit 7 generates one picture image SP from at least some of the image capturing results from the plurality of frame periods Tf in each picture image generation period T1. In the same manner, the controller 42 alternately provides the picture image generation periods T1 and the interrupt periods T2, and the image processing unit 7 generates a plurality of picture images SP.

Figure 5A:
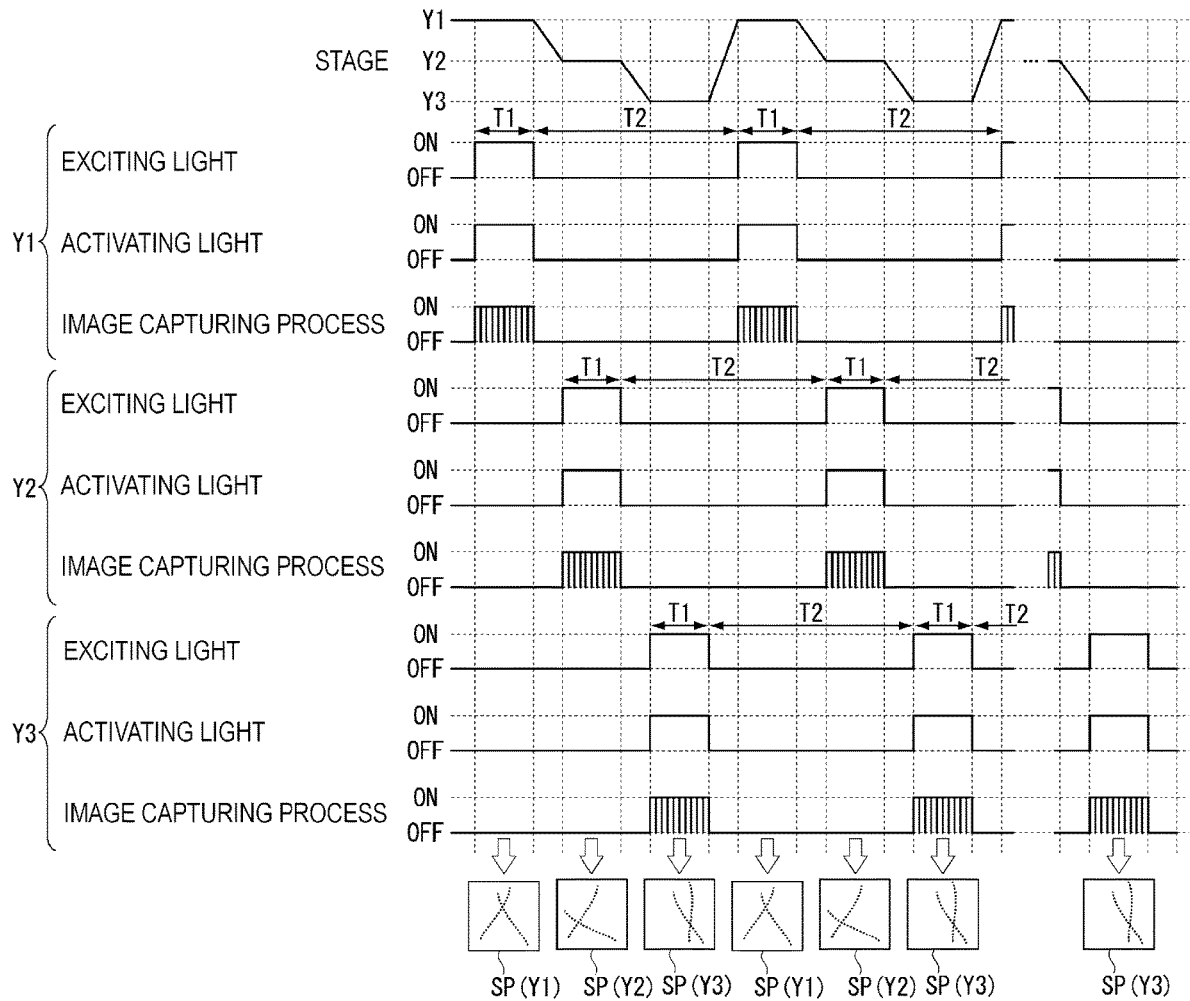
FIGS. 5A and 5B are diagrams illustrating another form of the sequence of illumination and image capturing according to the first embodiment.
Figure 5B:
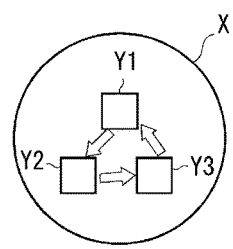

In a case where the view field for observing the sample X is changed, FIG. 5A is a conceptual diagram illustrating a sequence of illumination and image capturing according to the present embodiment, and FIG. 5B is a diagram illustrating a view field. The view field on the sample X is, for example, initially located at Y1, and is then moved to Y2 and Y3 in that order before returning to Y1 by moving the stage 2. In FIG. 5A, "Y1", "Y2", and "Y3" in the "Stage" indicate states in which the view field on the sample X is located at Y1, Y2, and Y3, respectively, as indicated in FIG. 5B. When the view field is located at Y1 (stage: Y1), the controller 42 causes the activating light L1 and the exciting light L2 to be emitted and causes the image capturing unit 6 to carry out the image capturing process. The image processing unit 7 generates one picture image SP (Y1) from at least some of the image capturing results from the picture image generation period T1 for the view field (Y1).

After the picture image generation period T1 for the view field (Y1) ends, the controller 42 controls the stage 2 to position the view field on the sample X at Y2. While the view field is positioned at Y2 (stage: Y2), the controller 42 causes the activating light L1 and the exciting light L2 to be emitted and causes the image capturing unit 6 to carry out the image capturing process. The image processing unit 7 generates one picture image SP (Y2) from at least some of the image capturing results from the picture image generation period T1 for the view field (Y2). After the picture image generation period T1 for the view field (Y2) ends, the controller 42 controls the stage 2 to position the view field on the sample X at Y3. While the view field is positioned at Y3 (stage: Y3), the controller 42 causes the activating light L1 and the exciting light L2 to be emitted and causes the image capturing unit 6 to carry out the image capturing process. The image processing unit 7 generates one picture image SP (Y3) from at least some of the image capturing results from the picture image generation period T1 for the view field (Y3).

After the picture image generation period T1 for the view field (Y3) ends, the controller 42 controls the stage 2 to position the view field on the sample X at Y1, and carries out the picture image generation period T1 again. The view field Y1 is irradiated with neither the activating light L1 nor the exciting light L2 during the period between the preceding picture image generation period T1 and the current picture image generation period T1. In other words, for the view field Y1, the period between the preceding and current picture image generation periods T1 is the interrupt period T2. Similarly, for the view field Y2 and the view field Y3, the period between the preceding and current picture image generation periods T1 are the interrupt period T2.

Although the controller 42 carries out the picture image generation period T1 at least twice in the control sequence, it should be noted that the number of times the picture image generation period T1 is carried out can be set as desired. Additionally, the plurality of picture image generation periods T1 may have the same lengths or may have different lengths. Furthermore, it is sufficient that the controller 42 carry out at least one interrupt period T2 with respect to a plurality of picture image generation periods T1. For example, the controller 42 may carry out the interrupt period T2 after carrying out two picture image generation periods T1 in sequence, and then carry out another picture image generation period T1. In a case where a plurality of interrupt periods T2 are carried out, the plurality of interrupt periods T2 may have the same lengths or may have different lengths.

Figure 6:
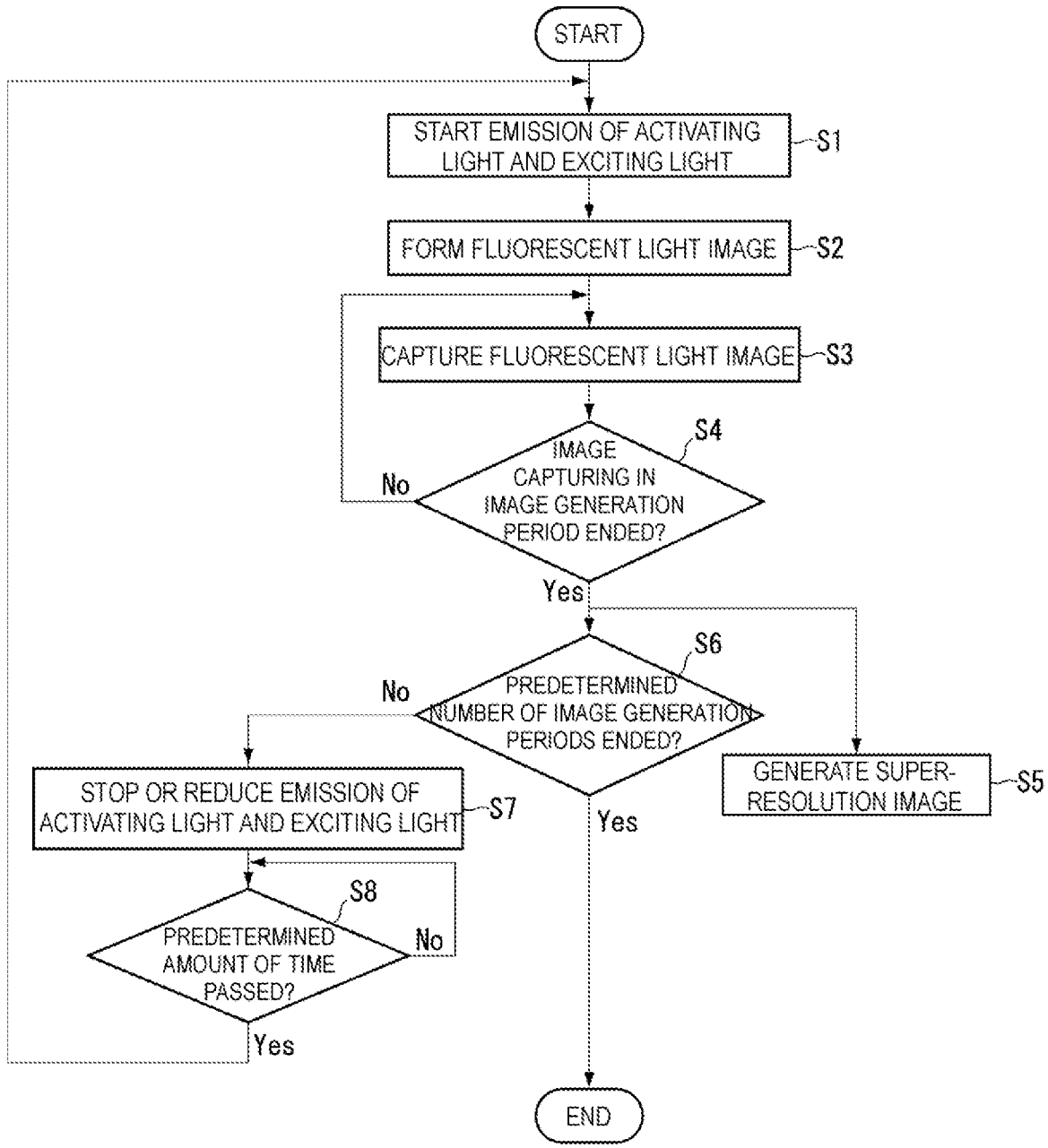
FIG. 6 is a flowchart illustrating an observation method according to the first embodiment.

Next, an observation method according to the embodiment will be described on the basis of the configuration of the microscope apparatus 1 as described above. FIG. 6 is a flowchart illustrating the observation method according to the embodiment. First, as pre-processing, the microscope apparatus 1 sets whether or not to carry out the interrupt period T2. For example, the controller 42 causes an image requesting a user instruction whether or not to carry out the interrupt period T2 to be displayed in the display device 44 and sets whether or not to carry out the interrupt period T2 in accordance with the user instruction. Alternatively, the controller 42 may set whether or not to carry out the interrupt period T2 in accordance with setting information indicating whether or not to carry out the interrupt period T2. The setting information may be information prestored in the storage device 43, for example. The following will describe a case where the interrupt period T2 is carried out.

In step S1, for example, the controller 42 controls the acousto-optic element 14 to start the emission of the activating light L1 and the exciting light L2 and start the picture image generation period T1. As a result, the illumination optical system 4 irradiates the view field Y on the sample X with the activating light L1 and the exciting light L2, and the imaging optical system 5 forms an image of fluorescent light from the fluorescent material contained in the sample X (step S2). In step S3, the controller 42 controls the image capturing unit 6 to capture the image of the fluorescent light. In step S4, the controller 42 determines whether or not image capturing for one picture image generation period T1 has ended. For example, a set value for the number of frame periods (number of images to be captured) in one picture image generation period T1 is stored in the storage device 43, and the controller 42 increments a counter for the number of images to be captured each time the image capturing of step S3 ends, the controller 42 then determines whether or not the image capturing in one picture image generation period T1 has ended by comparing the counter with the set value. When determining that image capturing in one picture image generation period T1 has not ended (step S4: No), the controller 42 causes the processing of step S3 to be executed.

When determining that image capturing in one picture image generation period T1 has ended (step S4: Yes), in step S5, the controller 42 causes the image processing unit 7 to generate one super-resolution image, for example. The image processing unit 7 generates one super-resolution image from at least some of the image capturing results obtained by repeating the image capturing in step S3 a number of times equivalent to the set value. When determining that image capturing in one picture image generation period T1 has ended (step S4: Yes), in step S6, the controller 42 determines whether or not a predetermined number of picture image generation periods T1 have ended. For example, a set value indicating the number of picture image generation periods T1 is stored in the storage device 43, and the controller 42 increments a counter of the number of picture image generation periods T1 upon determining that the image capturing in one picture image generation period T1 has ended; then, the controller 42 determines whether or not the image capturing in a predetermined number of picture image generation periods T1 has ended by comparing the counter with the set value.

When determining that image capturing in the predetermined number of picture image generation periods T1 has ended (step S7: Yes), the controller 42 terminates the series of processes. When determining that image capturing in the predetermined number of picture image generation periods T1 has not ended (step S7: No), the controller 42 controls the acousto-optic element 14 to stop or reduce the emission of the activating light L1 and the exciting light L2 and starts the interrupt period T2, for example. In step S8, the controller 42 stops or reduces the emission of the activating light L1 and the exciting light L2, before determining whether or not a predetermined amount of time has passed. The predetermined amount of time may be constant (a fixed value) throughout a plurality of interrupt periods T2, or may differ (may be a variable value) among the plurality of interrupt periods T2. For example, the length of the interrupt period T2 may be adjusted depending on the length of the picture image generation period T1. For example, the total length of a consecutive picture image generation period T1 and interrupt period T2 may be a fixed value. For example, in a case where the picture image generation period T1 is long, the interrupt period T2 following that picture image generation period T1 may be adjusted to be shorter. For example, the length of the subsequent interrupt period T2 may be adjusted so that that interrupt period T2 compensates for the amount of variation in the picture image generation period T1. In the case where a picture image generation period T1 is long, the interrupt period T2 following that picture image generation period T1 may be adjusted to be longer. When determining that the predetermined amount of time has not passed (step S8: No), the controller 42 repeats the processing of step S8 at a predetermined time interval, for example. When determining that the predetermined amount of time has passed (step S8: Yes), the controller 42 returns to step S1, starts the emission of the activating light L1 and the exciting light L2, and starts the next picture image generation period T1. The controller 42 repeats the above-described processing to cause the image capturing in the predetermined number of picture image generation periods T1 to be executed.

Second Embodiment

Figure 7:
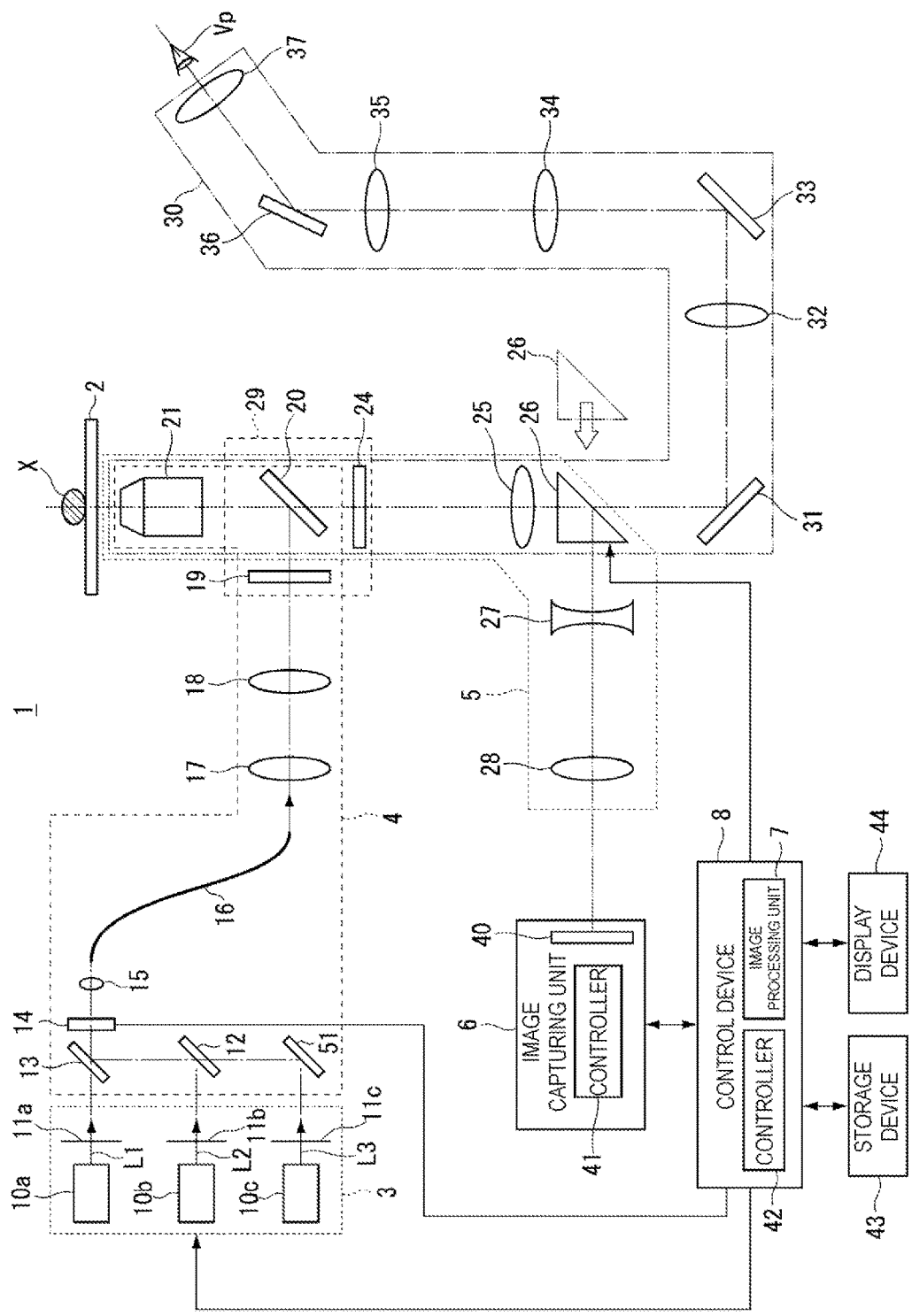
FIG. 7 is a diagram illustrating a microscope apparatus according to a second embodiment.

A second embodiment will now be described. The present embodiment describes an aspect in which two types of fluorescent dyes (for example, reporter dye) are used as label, but three or more types of fluorescent dyes (for example, reporter dyes) may be used. FIG. 7 is a diagram illustrating a microscope apparatus 1 according to the present embodiment. In the present embodiment, components identical to those in the above-described embodiment will be given the same reference numerals, and descriptions thereof will be simplified or omitted as appropriate.

In the present embodiment, the illumination optical system 4 irradiates the sample X with exciting light of two different wavelengths according to the fluorescent dyes (for example, reporter dyes). The light source device 3 includes an exciting light source 10c and a shutter 11c. The exciting light source 10b emits the exciting light L2 of a first wavelength, and the exciting light source 10c emits exciting light L3 of a second wavelength that is different from the first wavelength. Here, the second wavelength is a shorter wavelength than the first wavelength. For example, the first wavelength is 647 nm, and the second wavelength is 561 nm. Under the control of the controller 42, the shutter 11c can switch between a state of allowing the exciting light L3 from the exciting light source 10c to pass therethrough and a state of blocking the exciting light L3. The illumination optical system 4 includes a mirror 51 on a light exit side of the exciting light source 10c. The exciting light L3 from the exciting light source 10c is reflected by the mirror 51 and enters the dichroic mirror 13. The dichroic mirror 13 and the dichroic mirror 20 have a characteristic of reflecting the exciting light L3, the exciting light L3 travels along the same optical path as the exciting light L2, and the sample X is irradiated with the exciting light L3.

Figure 8:
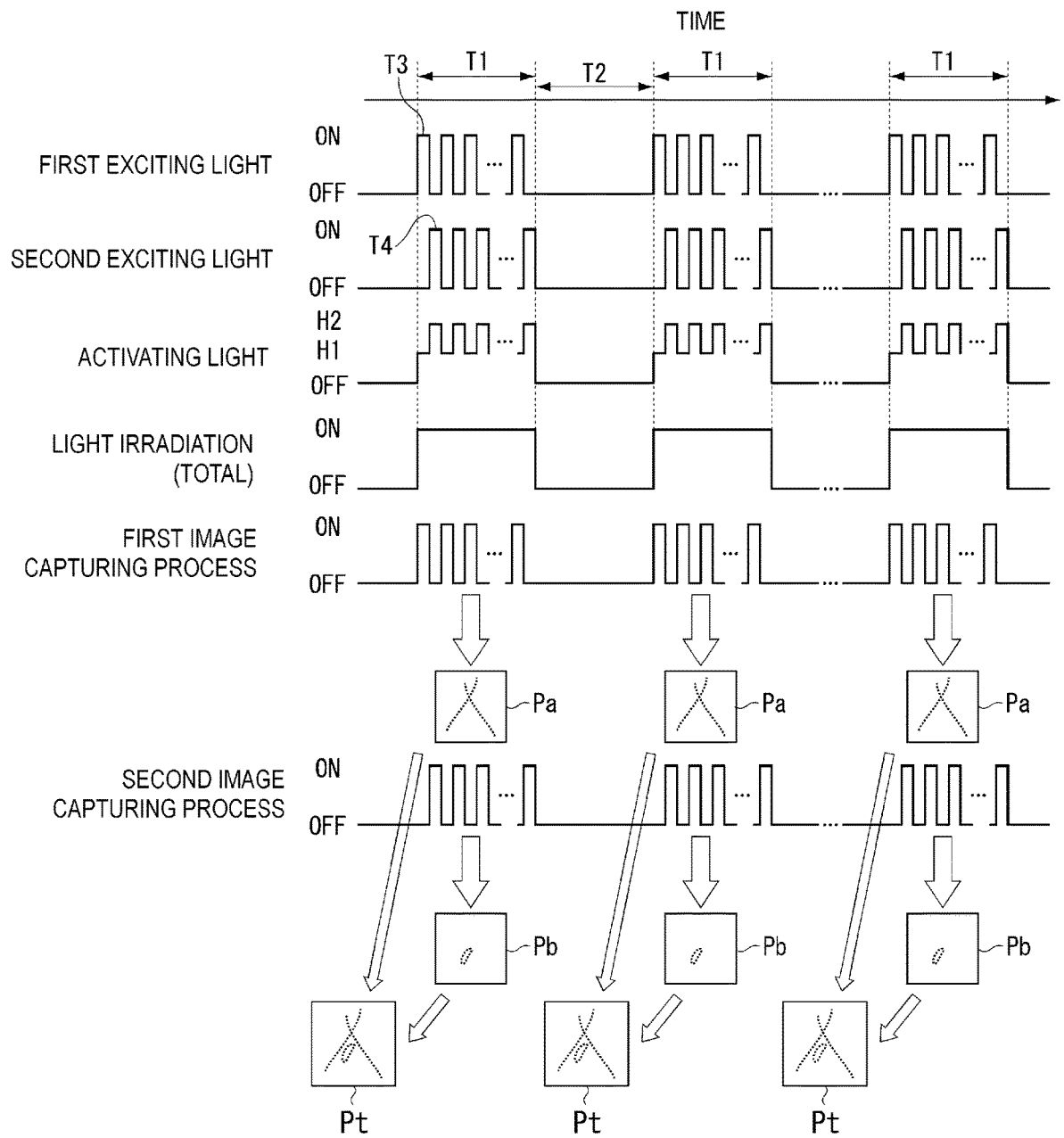
FIG. 8 is a diagram illustrating a sequence of illumination and image capturing according to the second embodiment.

FIG. 8 is a diagram illustrating a sequence of illumination and image capturing according to the present embodiment. The controller 42 causes first exciting light (the exciting light L2) and second exciting light (the exciting light L3) to be alternately emitted in the picture image generation period T1. The controller 42 causes the first exciting light to be emitted in a first period of the picture image generation period T1 (called a "first wavelength period T3" hereinafter) and causes the second exciting light to be emitted in a second period of the picture image generation period T1 (called a "second wavelength period T4" hereinafter). Additionally, the controller 42 causes the activating light to be emitted in parallel with the first exciting light or the second exciting light in the picture image generation period T1. For example, the controller 42 causes the activating light to be emitted throughout the first wavelength period T3 and the second wavelength period T4. Note that the intensity of the activating light is adjusted depending on the fluorescent material. For example, the intensity of the activating light is set to be higher while the second exciting light is being emitted than while the first exciting light is being emitted. For example, the controller 42 controls the acousto-optic element 14 to adjust the intensity of the activating light. "Light irradiation (total)" in FIG. 8 represents a state where at least one of the activating light, the first exciting light, and the second exciting light is being emitted as "ON" and a state in which none of the activating light, the first exciting light, and the second exciting light are being emitted as "OFF".

The controller 42 controls the image capturing unit 6 to execute a first image capturing process in the first wavelength period T3 (that is, while the first exciting light is being emitted). In the picture image generation period T1, the controller 42 causes the first image capturing process to be executed repeatedly in correspondence with the first wavelength period T3. The image processing unit 7 generates a first picture image Pa from at least some of the image capturing results obtained through a plurality of the first image capturing processes in the picture image generation period T1. Additionally, the controller 42 controls the image capturing unit 6 to execute a second image capturing process in the second wavelength period T4 (that is, while the second exciting light is being emitted). In the picture image generation period T1, the controller 42 causes the second image capturing process to be executed repeatedly. The image processing unit 7 generates a second picture image Pb from at least some of the image capturing results obtained through a plurality of the second image capturing processes in the picture image generation period T1. The two types of fluorescent dyes (for example, reporter dyes) are used to label different organelles or the like in the sample X, and thus picture images of different organelles are obtained in the first picture image Pa and the second picture image Pb. The image processing unit 7 composites the first picture image Pa and the second picture image Pb into one picture image Pt, for example. Note that the image processing unit 7 may generate one picture image Pt without the use of the first picture image Pa and the second picture image Pb, for example. In other words, the image generation processing unit 7 may generate one picture image Pt from at least some of the image capturing results obtained through a plurality of the first image capturing processes and at least some of the image capturing results obtained through the second image capturing processes. As a result, in a case where the emission of the first exciting light and the emission of the second exciting light are carried out repeatedly in an alternating manner for each frame period during the picture image generation period T1, the localization of the fluorescent material to be observed in time and space can be clarified with ease.

Third Embodiment

A third embodiment will now be described. The present embodiment describes another aspect in which two types of fluorescent dyes (for example, reporter dyes) are used as label. Three or more types of fluorescent dyes (for example, reporter dyes) may be used. In the present embodiment, components identical to those in the above-described embodiments will be given the same reference numerals, and descriptions thereof will be simplified or omitted as appropriate.

Figure 9:
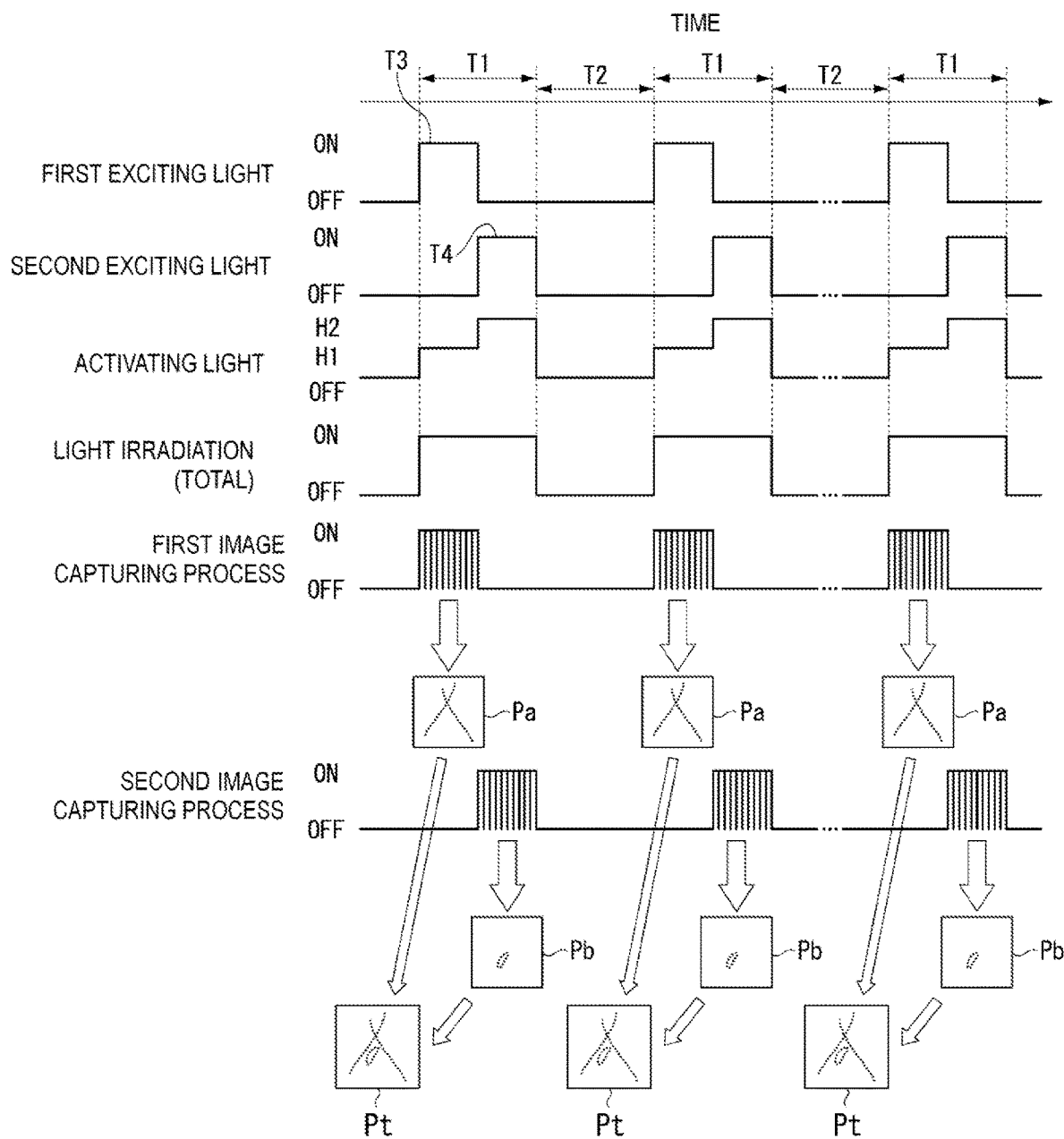
FIG. 9 is a diagram illustrating a sequence of illumination and image capturing according to a third embodiment.

FIG. 9 is a diagram illustrating a sequence of illumination and image capturing according to the present embodiment. In the picture image generation period T1, the controller 42 carries out a plurality of the first wavelength periods T3 consecutively and then carries out a plurality of the second wavelength periods T4 consecutively. In the plurality of the first wavelength periods T3, the controller 42 causes the first exciting light to be emitted to cause the image capturing unit 6 to execute the first image capturing process repeatedly. The image processing unit 7 generates a first picture image Pa from at least some of the image capturing results obtained through a plurality of first image capturing processes in the picture image generation period T1. In the plurality of the second wavelength periods T4, the controller 42 causes the second exciting light to be emitted to cause the image capturing unit 6 to execute the second image capturing process repeatedly. The image processing unit 7 generates a second picture image Pb from at least some of the image capturing results obtained through a plurality of second image capturing processes in the picture image generation period T1. The image processing unit 7 composites the first picture image Pa and the second picture image Pb into one picture image Pt, for example. Note that the image processing unit 7 may generate one picture image Pt without the use of the first picture image Pa and the second picture image Pb, for example. In other words, the image generation processing unit 7 may generate one picture image Pt from at least some of the image capturing results obtained through a plurality of the first image capturing processes and at least some of the image capturing results obtained through the second image capturing processes. As a result, in a case where two or more frame periods are provided consecutively in the first wavelength period T3 and thereafter, two or more frame periods are provided consecutively in the second wavelength period T4, fading of the fluorescent material to be observed can be suppressed and the two or more types of fluorescent light can be separated more easily. Note that the microscope apparatus 1 may be capable of switching between a mode in which the exciting light is switched for each frame period as described in second embodiment, and a mode in which the exciting light is switched for every two or more frame periods as described in the present embodiment.

Fourth Embodiment

Figure 10:
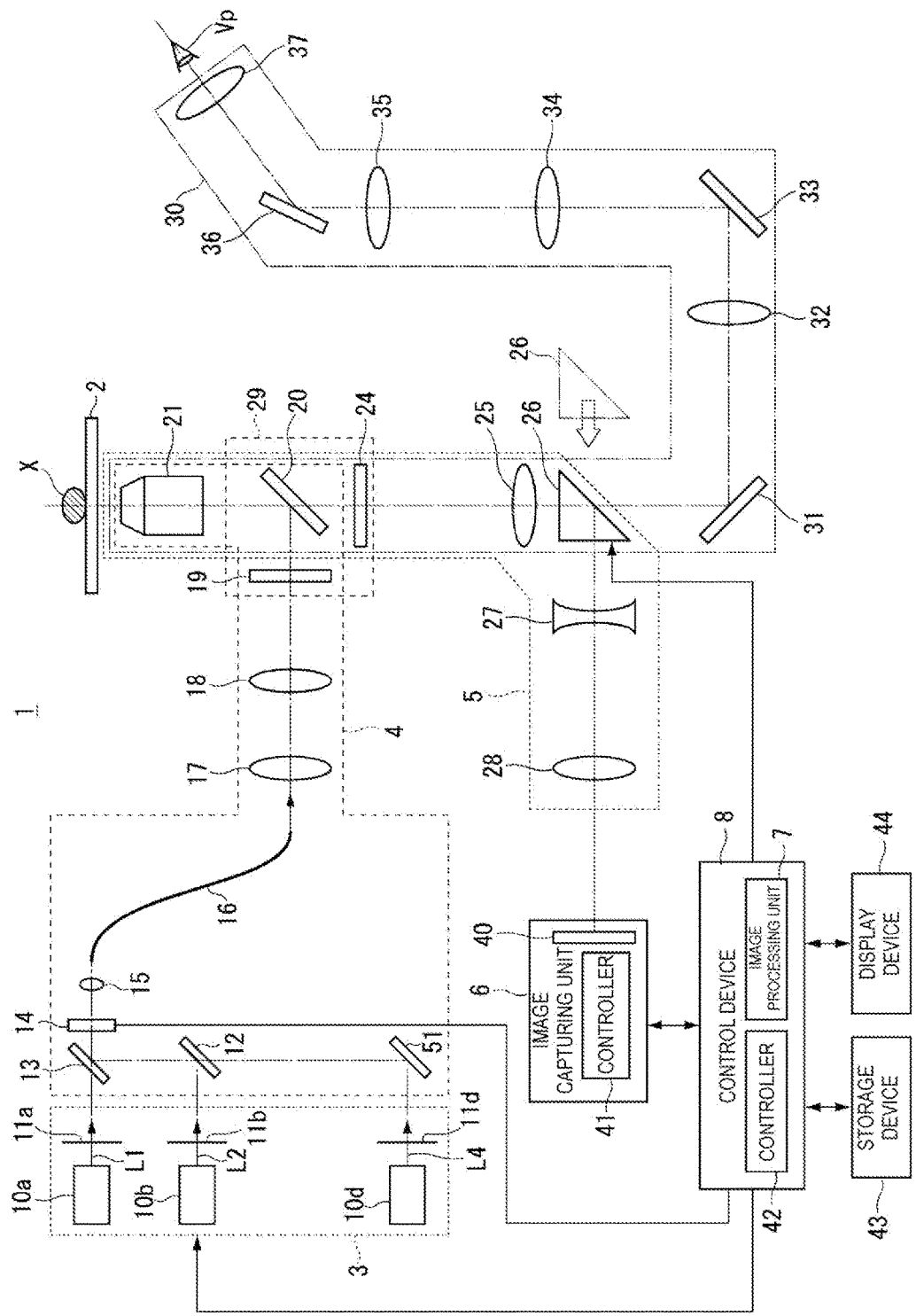
FIG. 10 is a diagram illustrating a microscope apparatus 1 according to a fourth embodiment.

A fourth embodiment will now be described. The present embodiment will describe an aspect in which displacement (a drift amount) of the stage 2 or the like of the microscope apparatus 1 is detected. Although an example in which there are two types of fluorescent dyes (for example, reporter dyes) will be described here, there may also be one type, or three or more types, of fluorescent dyes (for example, reporter dyes). FIG. 10 is a diagram illustrating a microscope apparatus 1 according to the present embodiment. In the present embodiment, components identical to those in the above-described embodiments will be given the same reference numerals, and descriptions thereof will be simplified or omitted as appropriate.

In the present embodiment, the illumination optical system 4 emits auxiliary light L4 for detecting the position of the sample X. For example, the sample X is given a fiducial marker indicating the position of the sample X, and the illumination optical system 4 emits the auxiliary light L4 for detecting the fiducial marker. The fiducial marker is, for example, fluorescent beads that give off fluorescent light, and the auxiliary light L4 includes light that excites the fiducial marker.

The light source device 3 includes an exciting light source 10*d* and a shutter 11*d*. The exciting light source 10*d* emits the auxiliary light L4. The wavelength of the auxiliary light L4 is set to a wavelength different from those of the activating light L1 and the exciting light L2, for example. The optical intensity of the auxiliary light L4 is lower than the optical intensity of the exciting light L2, for example. Under the control of the controller 42, the shutter 11*d* can switch between a state of allowing the auxiliary light L4 from the exciting light source 10*d* to pass therethrough and a state of blocking the auxiliary light L4. Additionally, under the control of the controller 42, the acousto-optic element 14 switches between the light-passing state in which the auxiliary light L4 is allowed to pass therethrough and a state in which the auxiliary light L4 is blocked or the intensity of the auxiliary light L4 is reduced (the light-blocking state).

The illumination optical system 4 includes the mirror 51 on a light exit side of the exciting light source 10*d*. The auxiliary light L4 from the exciting light source 10*d* is reflected by the mirror 51 and enters the dichroic mirror 13. The dichroic mirror 13 and the dichroic mirror 20 have a characteristic of reflecting the auxiliary light L4, the auxiliary light L4 travels along the same optical path as the activating light L1 and the exciting light L2, and the sample X is irradiated with the auxiliary light L4.

The controller 42 causes the sample X to be irradiated with the auxiliary light L4, causes the image capturing unit 6 to capture an image, and causes fluorescent light from the fiducial marker to be detected. The frequency with which the fluorescent light from the fiducial marker is detected is set as desired. For example, image capturing based on the auxiliary light L4 may be carried out each time an image is captured in one frame period on the basis of the exciting light, or may be carried out each time an image is captured in a plurality of frame periods on the basis of the exciting light.

Figure 11:
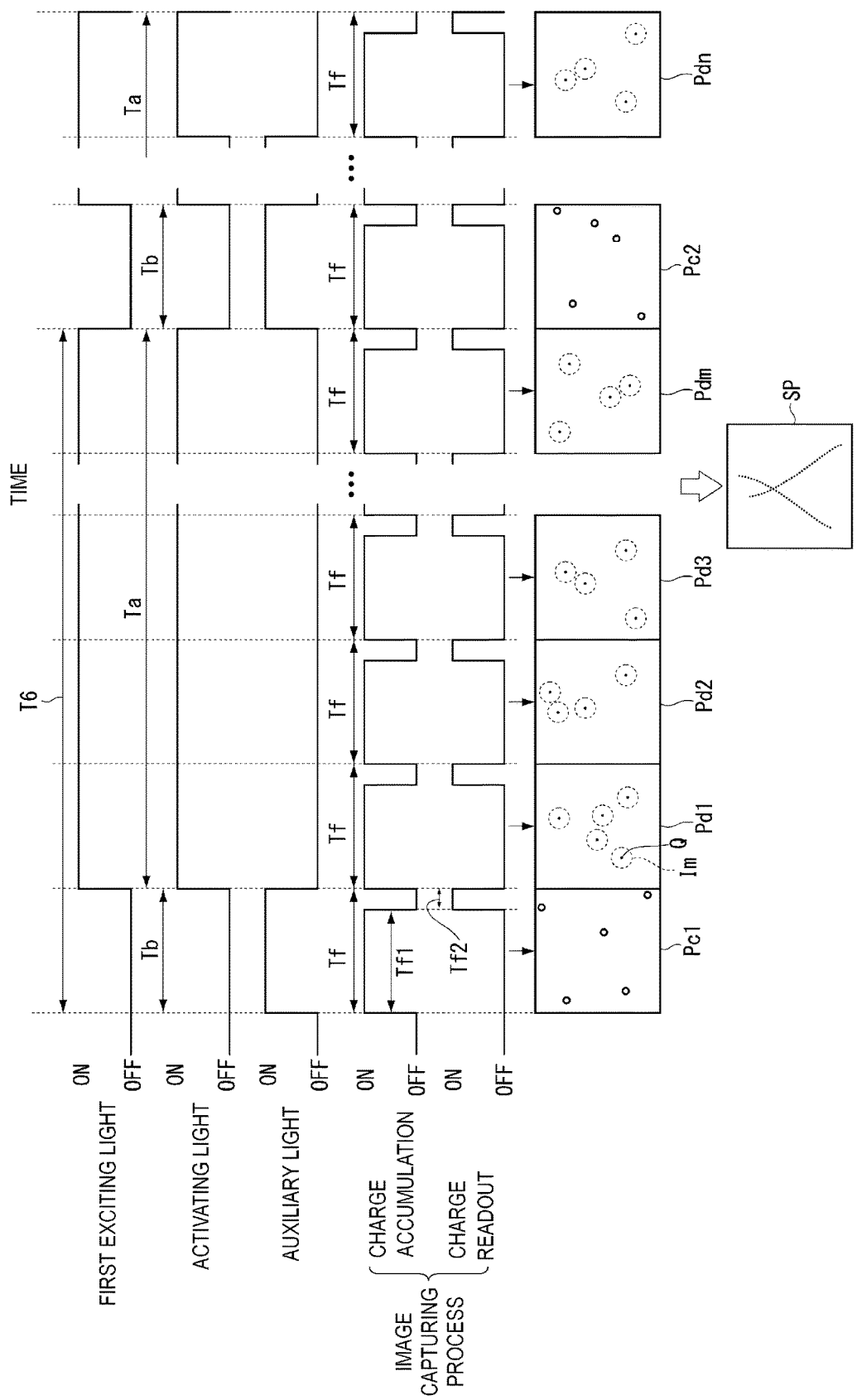
FIG. 11 is a diagram illustrating a sequence of illumination and image capturing according to the fourth embodiment.

FIG. 11 is a diagram illustrating a sequence of illumination and image capturing according to the present embodiment. In a period Ta, the controller 42 causes the sample X to be irradiated with the activating light L1 and the exciting light L2, and causes the image capturing unit 6 to capture an image of the sample X. The activating light L1 stochastically activates the fluorescent material, and the activated fluorescent material is excited by being irradiated with the exciting light L2. Captured images (Pd1 to Pdm) obtained in the period Ta are, for example, images obtained by capturing images of fluorescent light from the fluorescent material contained in the sample X (for example, a reporter dye), and are used to generate a picture image expressing the structure of the sample X. The image capturing unit 6 generates the captured images Pd1 to Pdn as image capturing results from respective frame periods Tf. The image processing unit 7 generates one picture image SP (for example, a super-resolution image) from at least some of the captured images Pd1 to Pdn.

In a period Tb, the controller 42 causes the auxiliary light L4 to be emitted in a state where the activating light L1 and the exciting light L2 are stopped or reduced, and causes the image capturing unit 6 to capture an image of the sample X. The period Tb is carried out in a frame period Tf preceding the period Ta, for example. For example, in FIG. 11, a captured image Pc1 is obtained through image capturing carried out in the first period Tb, the captured images Pd1 to Pdm are obtained by carrying out the image capturing of a predetermined number (m) of frame periods Tf in the period Ta following the period Tb, and thereafter, a captured image Pc2 is obtained through image capturing carried out in the period Tb. In this case, the captured image Pc1 based on the auxiliary light L4 is obtained at a frequency 1/m with respect to the captured images (Pd1 to Pdm) based on the exciting light L2. Note that the predetermined number (m) is set as desired, and may be 1, 10, 100, 1,000, 5,000, 10,000, or the like, for example. In FIG. 11, reference numeral T6 indicates a period including one period Tb and a period Ta following that period Tb. The controller 42 provides a plurality of the periods T6 in one picture image generation period T1, for example.

The image processing unit 7 corrects at least some of the captured images obtained in one period Ta following the captured image Pc2 using the image capturing results obtained in the period Tb (for example, the captured images Pc1 and Pc2). Additionally, the image processing unit 7 corrects a plurality of captured images obtained from a plurality of the periods Ta, and generates one picture image from at least some of the post-correction captured images. The image processing unit 7 calculates the displacement (drift amount, movement amount) from the image capturing results from the period Tb (the captured images Pc1 and Pc2). The image processing unit 7 corrects the captured images from the period Ta using the calculated displacement. For example, the image processing unit 7 corrects the center-of-gravity positions Q of the captured images captured in the period Ta between the captured image Pc2 and a captured image Pc3 (indicated in FIG. 12) using the displacement calculated from the captured image Pc1 and the captured image Pc2. The image processing unit 7 merges numerous post-correction center-of-gravity positions Q to generate (construct) one image.

Figure 12:
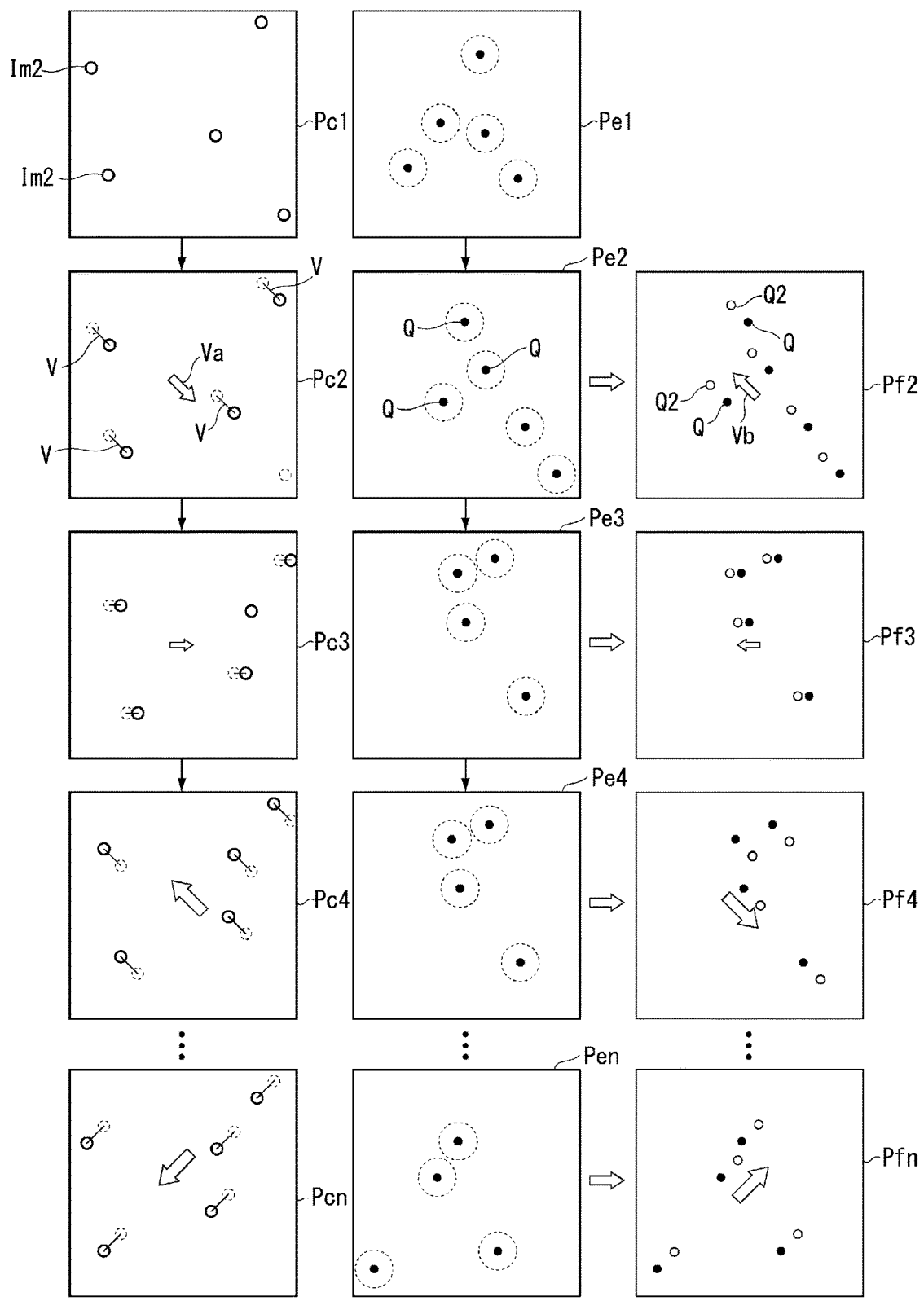
FIG. 12 is a diagram illustrating a process of detecting displacement of a sample and a process of correcting an image capturing result.

FIG. 12 is a diagram illustrating a process of detecting displacement of the sample and a process of correcting the image capturing result. In FIG. 12, reference numerals Pc1 to Pcn indicate captured images based on the auxiliary light L4. The image processing unit 7 corrects the captured images captured between the captured image Pc2 and the captured image Pc3 using the same correction amount, for example. The image processing unit 7 calculates a correction amount for the captured images captured in the period Ta between the captured image Pc2 and the captured image Pc3 using the captured image Pc1 and the captured image Pc2, for example. In FIG. 12, the captured image denoted as reference numeral Pe1 expresses a representative image among the captured images Pd1 to Pdm captured between the captured image Pc1 and the captured image Pc2. The same applied to the captured images Pe2 to Pen. Reference numerals Pf2 to Pfn indicate corrected images. For example, the image Pf2 is an image obtained by correcting the captured image Pe2.

Fluorescent light images Im2 from the fiducial marker are distributed throughout the captured images Pc1 to Pcn. The fluorescent light images in the preceding captured images are indicated by dotted lines in the captured images Pc2 to Pcn. For example, the dotted line parts in the captured image Pc2 correspond to the fluorescent light images Im2 in the captured image Pc1. The image processing unit 7 calculates displacements V (vectors) of respective fluorescent light images in the captured image Pc1 and the captured image Pc2, for example. For example, the fiducial markers are sparsely distributed throughout the sample X so that the distance between fiducial markers in the sample X is greater than an expected upper limit value of the displacement (for example, displacement of the stage 2). The image processing unit 7 takes the closest fluorescent light image between the captured image Pc1 and the captured image Pc2 as a fluorescent light image corresponding to the same fiducial marker, and calculates the displacement of the corresponding fluorescent light image. The image processing unit 7 then calculates an average Va (vector) of the displacements V of a plurality of fluorescent lights. Note that the image processing unit 7 may find an image correlation while moving the captured image Pc1 and the captured image Pc2 relative to each other and then take a relative movement amount between the captured image Pc1 and the captured image Pc2 where a correlation coefficient is highest as the average of the displacement.

The image processing unit 7 finds the displacement using the fluorescent light images present in both of two comparable images among the captured images Pc1 to Pcn. For example, fluorescent light images corresponding to the same fiducial marker are present in both the captured image Pc1 and the captured image Pc3, and thus in the case where that fluorescent light image is not present in the captured image Pc2, the image processing unit 7 can use that fluorescent light image to calculate the displacement of the fluorescent light image between the captured image Pc1 and the captured image Pc3. The image processing unit 7 can be configured to not use a fluorescent light image present in only one of the two compared images in the displacement calculation.

The image processing unit 7 calculates the center-of-gravity positions of the fluorescent material for each of the captured images Pe2 to Pen based on the exciting light L2. Here, an example will be described in which the captured image Pe1 serves as a reference image and the positions of the fluorescent light images in the captured image Pe2 are corrected. The image processing unit 7 calculates the center-of-gravity position Q of each fluorescent light image in the captured image Pe2. The image processing unit 7 then carries out the correction using the average Va of the displacement between a captured image Pc2 for correction, which corresponds to the image capturing timing of the captured image Pe2 to be corrected, and a captured image Pc1 for correction, which corresponds to the image capturing timing of the captured image Pe1 serving as the reference. The captured image Pc2 for correction is, for example, a captured image captured in the period Tb immediately before the period Ta in which the captured image Pe2 to be corrected was captured. The image processing unit 7 corrects the center-of-gravity positions Q of the fluorescent light images in the captured image Pe2 to center-of-gravity positions Q2 moved by a correction amount Vb (vector) that is an inverse of the average Va of the displacement, as indicated by the image Pf2. The image processing unit 7 corrects at least some of the plurality of captured images captured in the period Ta between the captured image Pc2 and the captured image Pc3 in the same manner as the captured image Pe2. Additionally, the image processing unit 7 corrects at least some of the plurality of captured images captured in the periods Ta following the captured image Pc3 in the same manner. The image processing unit 7 generates one image from, for example, at least some of the reference captured images (for example, the captured images Pd1 to Pdm) and the corrected images.

Although the foregoing describes a case where the images from the captured images Pd1 to Pdm are corrected using the average Va of the displacement between Pc1 and Pc2 as an example, correction amounts for the plurality of captured images from Pd1 to Pdm may be calculated individually instead. For example, linear interpolation may be carried out using the amount of displacement between Pc1 and Pc2. For example, a value obtained by dividing the average Va of the displacements found for Pc1 and Pc2 by the number of captured images m may be taken as a correction amount for Pd1, and that quotient may be taken as a correction amount, integrated in accordance with the order in which the captured images are obtained, for subsequent captured images. The captured images can be corrected more accurately as a result.

Fifth Embodiment

Figure 13:
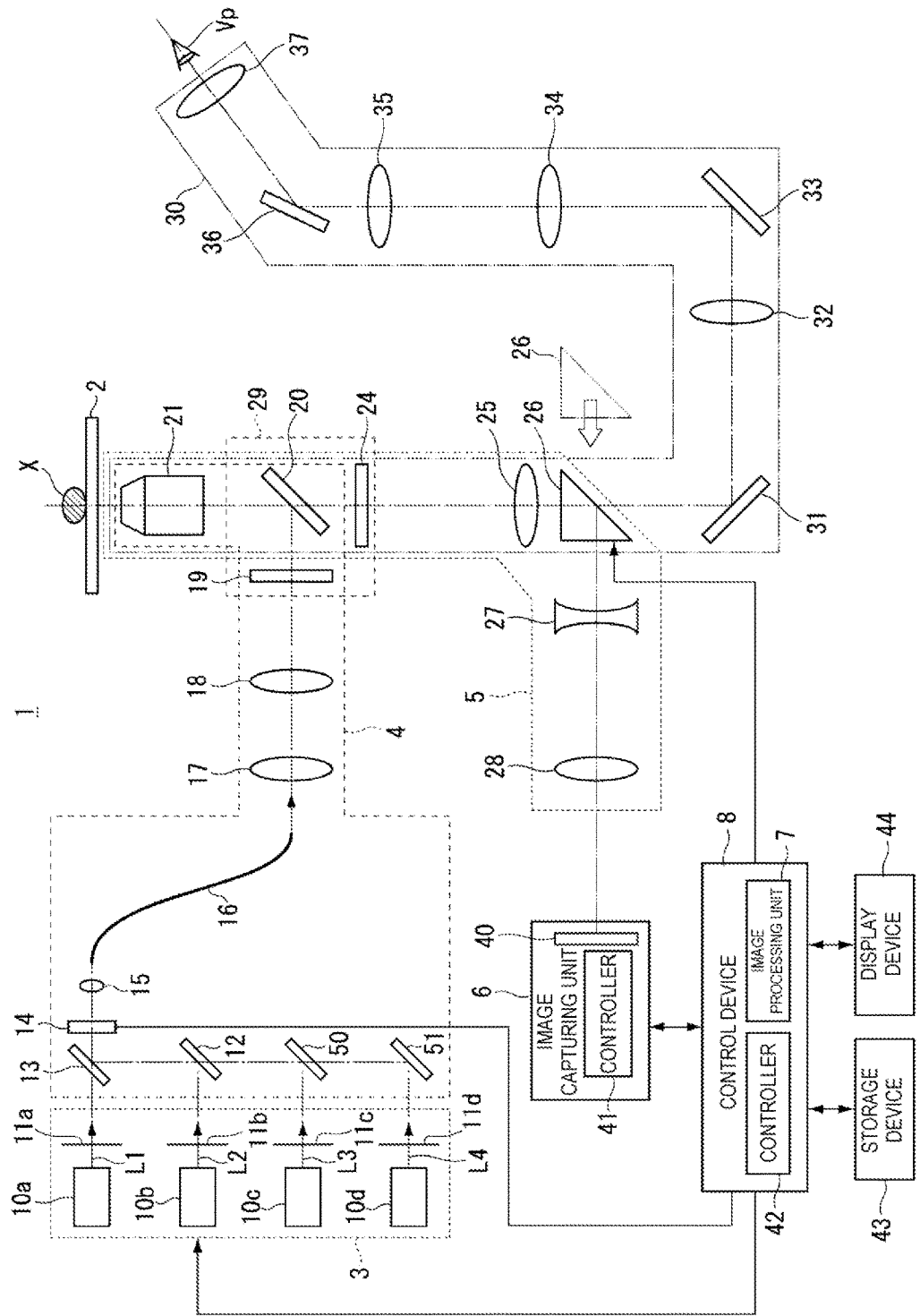
FIG. 13 is a diagram illustrating a microscope apparatus 1 according to a fifth embodiment.

A fifth embodiment will now be described. The present embodiment will describe an aspect in which displacement (a drift amount) of the stage 2 or the like of the microscope apparatus 1 is detected. Although an example in which there are two types of fluorescent dyes (for example, reporter dyes) will be described here, there may also be one type, or three or more types, of fluorescent dyes (for example, reporter dyes). FIG. 13 is a diagram illustrating a microscope apparatus 1 according to the present embodiment. In the present embodiment, components identical to those in the above-described embodiments will be given the same reference numerals, and descriptions thereof will be simplified or omitted as appropriate.

In the present embodiment, the illumination optical system 4 emits auxiliary light L4 for detecting the position of the sample X. For example, the sample X is given a fiducial marker indicating the position of the sample X, and the illumination optical system 4 emits the auxiliary light L4 for detecting the fiducial marker. The fiducial marker is, for example, fluorescent beads that give off fluorescent light, and the auxiliary light L4 includes light that excites the fiducial marker.

The light source device 3 includes an exciting light source 10*d* and a shutter 11*d*. The exciting light source 10*d* emits the auxiliary light L4. The wavelength of the auxiliary light L4 is set to a wavelength different from those of the activating light L1, the exciting light L2, and the exciting light L3, for example. The optical intensity of the auxiliary light L4 is lower than the optical intensity of the exciting light L2 and the optical intensity of the exciting light L3, for example. Under the control of the controller 42, the shutter 11*d* can switch between a state of allowing the auxiliary light L4 from the exciting light source 10*d* to pass therethrough and a state of blocking the auxiliary light L4. Additionally, under the control of the controller 42, the acousto-optic element 14 switches between the light-passing state in which the auxiliary light L4 is allowed to pass therethrough and a state in which the auxiliary light L4 is blocked or the intensity of the auxiliary light L4 is reduced (the light-blocking state).

The illumination optical system 4 includes the mirror 51 on a light exit side of the exciting light source 10*d*. The auxiliary light L4 from the exciting light source 10*d* is reflected by the mirror 51 and enters the dichroic mirror 13. The dichroic mirror 13 and the dichroic mirror 20 have a characteristic of reflecting the auxiliary light L4, the auxiliary light L4 travels along the same optical path as the activating light L1, the exciting light L2, and the exciting light L3, and the sample X is irradiated with the auxiliary light L4.

The controller 42 causes the sample X to be irradiated with the auxiliary light L4, causes the image capturing unit 6 to capture an image, and causes fluorescent light from the fiducial marker to be detected. The frequency with which the fluorescent light from the fiducial marker is detected is set as desired. For example, image capturing based on the auxiliary light L4 may be carried out each time an image is captured in one frame period on the basis of the exciting light, or may be carried out each time an image is captured in a plurality of frame periods on the basis of the exciting light.

Figure 14:
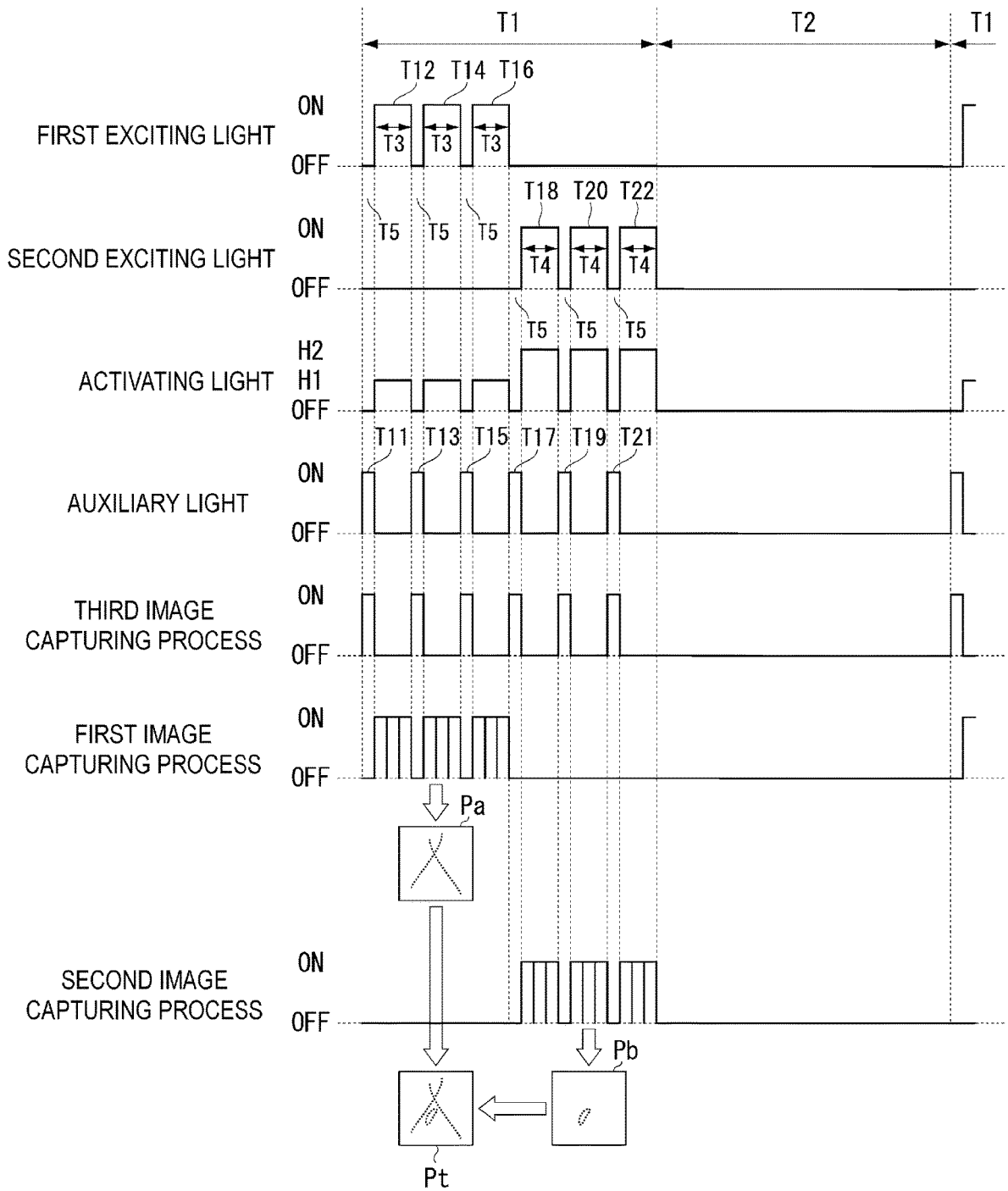
FIG. 14 is a diagram illustrating a sequence of illumination and image capturing according to the fifth embodiment.

FIG. 14 is a diagram illustrating a sequence of illumination and image capturing according to the present embodiment. The controller 42 provides the first wavelength periods T3 (for example, a period T12, a period T14, and a period T16) and the second wavelength periods T4 (for example, a period T18, a period T20, and a period T22) in the picture image generation period T1. The image processing unit 7 forms at least one picture image from at least some of the image capturing results from the image capturing unit 6 in the first wavelength periods T3 and at least some of the image capturing results from the image capturing unit in the second wavelength periods T4. For example, the image processing unit 7 generates the first picture image Pa from at least some of the image capturing results from the first wavelength periods T3 and generates the second picture image Pb from at least some of the image capturing results from the second wavelength periods T4. For example, the first picture image Pa and the second picture image Pb are images expressing different structures of the sample X. The image processing unit 7 generates one picture image Pt from the first picture image Pa and the second picture image Pb, for example. The picture image Pt is a composite picture image of the first picture image Pa and the second picture image Pb, for example. Note that the image processing unit 7 may generate one picture image Pt without the use of the first picture image Pa and the second picture image Pb, for example. In other words, the image generation processing unit 7 may generate one picture image Pt from at least some of the image capturing results obtained through a plurality of the first image capturing processes and at least some of the image capturing results obtained through the second image capturing processes. Next, the details of this configuration will be described.

In the first wavelength period T3 (for example, the period T12) the controller 42 causes the activating light L1 to be emitted (activating light: ON) and causes the exciting light L2 to be emitted (first exciting light: ON), and causes the image capturing unit 6 to capture fluorescent light images from the activated fluorescent material consecutively in a plurality of frame periods (first image capturing process: ON). The controller 42 adjusts the optical intensity of the activating light L1 in the first wavelength period T3 (H1 level in the drawing) depending on the type of the fluorescent material, for example. The controller 42 causes the auxiliary light L4 to be emitted and causes the image capturing unit 6 to capture an image of light from the fiducial marker (third image capturing process: ON) in a frame period (for example, a period T11) preceding each period in which the image capturing is carried out consecutively in the first wavelength period T3 (for example, the period T12). The image processing unit 7 corrects the captured image by associating the position of the sample X in the period T14 with the position of the fiducial marker in a period T13 preceding the period T14, for example. For example, when matching positions of the captured image from the period T12 and the captured image from the period T14, the image processing unit 7 finds displacement of the fiducial marker from the period T11 to the period T13 using the captured image from the period T11 and the captured image from the period T13; the image processing unit 7 can then match the position of the captured image from the period T14 to the captured image of the period T12 by correcting the captured image from the period T14 by an amount equivalent to that displacement. The amount of drift between the current and preceding first wavelength periods T3 can be found by comparing the preceding period T5 with the period T5 one period before. A position can be matched to a first wavelength period T3 serving as a reference by repeating this processing. As a result, the image processing unit 7 generates the first picture image Pa by matching the positions of a plurality of captured images obtained in the first wavelength periods T3.

Additionally, in the second wavelength period T4 (for example, the period T18), the controller 42 causes the activating light L1 to be emitted (activating light: ON), causes the second exciting light L3 to be emitted (second exciting light: ON), and causes the image capturing unit 6 to capture fluorescent light images of the activated second fluorescent material consecutively in a plurality of frame periods (second image capturing process: ON). The controller 42 adjusts the optical intensity of the activating light L1 in the second wavelength period T4 (H2 level in the drawing) depending on the type of the second fluorescent material, for example. The controller 42 causes the auxiliary light L4 to be emitted and causes the image capturing unit 6 to capture an image of light from the fiducial marker (third image capturing process: ON) in a frame period (for example, a period T19) preceding each period in which the image capturing is carried out consecutively in the second wavelength period T4 (for example, the period T20). The image processing unit 7 corrects the captured image by associating the position of the sample X in the period T20 with the position of the fiducial marker in the period T19 preceding the period T20, for example. For example, when matching positions of the captured image from the period T18 and the captured image from the period T20, the image processing unit 7 finds displacement of the fiducial marker from a period T17 to the period T19 using the captured image from the period T17 and the captured image from the period T19. The image processing unit 7 can then match the position of the captured image from the period T20 to the captured image of the period T18 by correcting the captured image from the period T20 by an amount equivalent to that displacement. Although the foregoing describes a case where the captured image from the period T20 is corrected by an amount equivalent to the displacement of the fiducial marker from the period T17 to the period T19 as an example, correction amounts for a plurality of captured images from the period T20 may be calculated individually using the displacement of the fiducial marker from the period T17 to the period T19. For example, the amount of displacement of the fiducial marker from the period T17 to the period T19 may be linearly interpolated in the captured image of the period T20. For example, a value obtained by dividing the amount of displacement of the fiducial marker from the period T17 to the period T19 by the number of captured images from the period T20 may be taken as a correction amount for the first captured image from the period T20, and that quotient may be taken as a correction amount, integrated in accordance with the order in which the captured images are obtained, for the subsequent captured images. The captured images can be corrected more accurately as a result. As a result, the image processing unit 7 generates the second picture image Pb by matching the positions of a plurality of captured images obtained in the second wavelength period T4. Additionally, the image processing unit 7 finds an amount of drift arising between a captured image serving as a reference for the position of the first picture image Pa (for example, a captured image from the period T12) and a captured image serving as the position of the second picture image Pb (for example, a captured image from the period T18) using captured images from the period T11 to the period T17, and corrects the second picture image Pb with a correction amount based on that displacement. Through this, position of the second picture image Pb can be matched to the first picture image Pa, and the picture image Pt can be obtained by compositing the post-correction second picture image Pb and the first picture image Pa. The controller 42 then causes the picture image Pt to be displayed in the display device 44, for example.

Incidentally, the part of the sample X appearing in the first picture image Pa is different from the part appearing in the second picture image Pb. Although it is difficult to find the amount of drift using autocorrelation in such a case, the drift amount can be found accurately according to the present embodiment.

Note that the controller 42 may cause the auxiliary light L4 to be emitted in the interrupt period T2 and cause the image capturing unit 6 to capture a fluorescent light image based on the auxiliary light L4 in the sequence illustrated in FIG. 8, for example. The capturing of the fluorescent light image based on the auxiliary light L4 may use a smaller number of frames than the image capturing of fluorescent light based on the first exciting light and the image capturing of fluorescent light based on the second exciting light, which damages the sample X less.

Note that the auxiliary light L4 for illuminating the fiducial marker need not be exciting light, and the microscope apparatus 1 may detect the fiducial marker from light passing through the sample X. Additionally, in this case, the sample X need not be given the fiducial marker, and for example, a mark or the like associated with the position of the sample X can be detected and displacement of the sample X can then be calculated. Furthermore, the image processing unit 7 may calculate an average of the displacements throughout the entirety of the captured image and then carry out correction uniformly throughout the entirety of the captured images using this average, or may calculate a displacement for each of regions (for example, a plurality of pixels) in the captured image and then carry out the correction on a region-by-region basis. Through this, for example, in the case where aberration increases toward the outer edge of the view field of the imaging optical system 5, the correction can be carried out factoring in such aberration.

Sixth Embodiment

Figure 15:
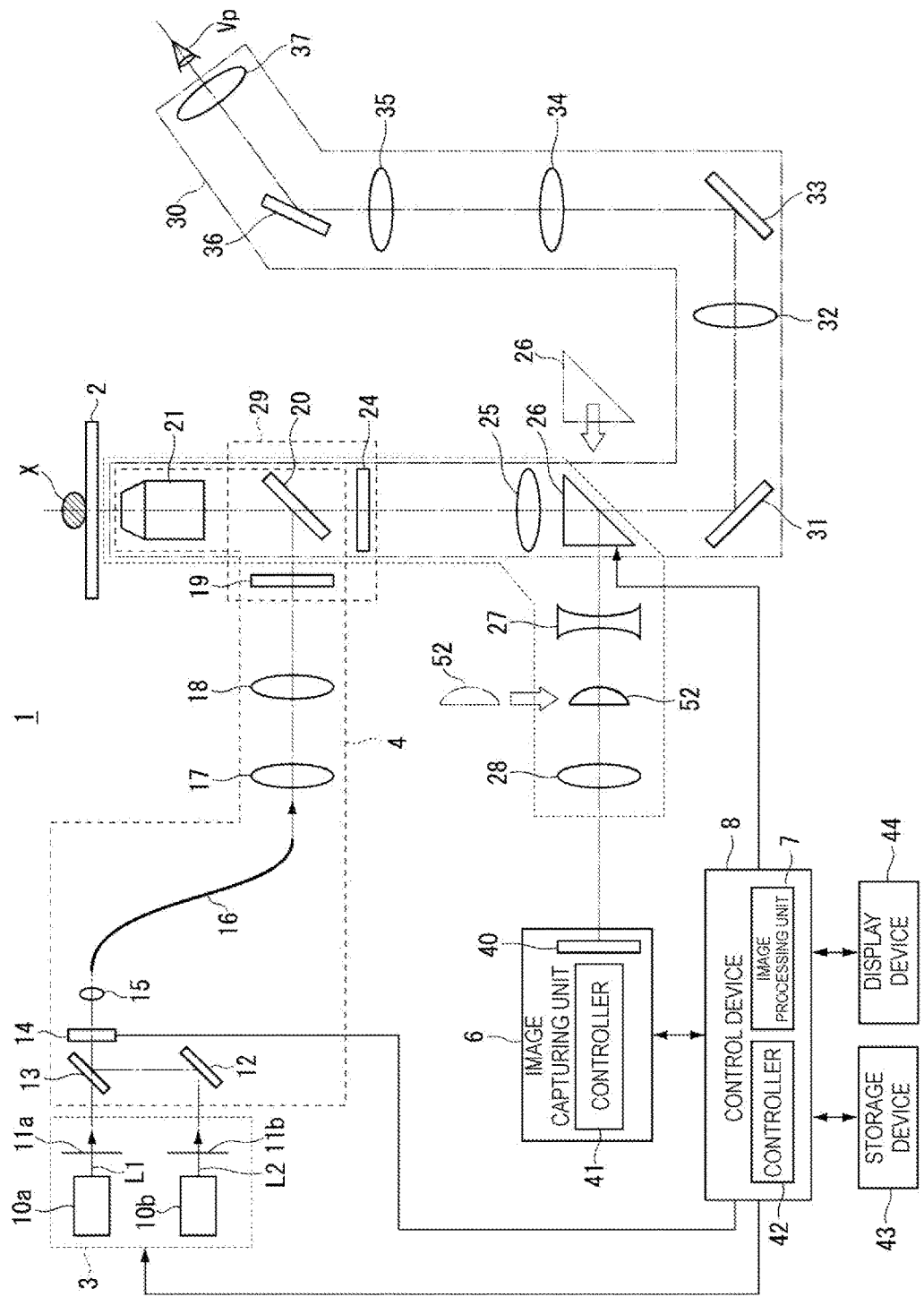
FIG. 15 is a diagram illustrating a microscope apparatus 1 according to a sixth embodiment.

A sixth embodiment will now be described. The present embodiment will describe a mode for generating a three-dimensional super-resolution image. FIG. 15 is a diagram illustrating a microscope apparatus 1 according to the present embodiment. Although the sequence of illumination and image capturing is the same as in the first embodiment here, the sequence of illumination and image capturing may be the same as that in any of the above-described embodiments, or may be a combination of the above-described embodiments. In the present embodiment, components identical to those in the above-described embodiments will be given the same reference numerals, and descriptions thereof will be simplified or omitted as appropriate.

The imaging optical system 5 according to the present embodiment includes an optical member 52. The optical member 52 is a cylindrical lens, for example. The optical member 52 is provided so as to be insertable into and retractable from an optical path between the lens 27 and the lens 28. The optical member 52 retracts from the optical path of the imaging optical system 5 in a mode for generating a two-dimensional super-resolution image, and is inserted into the optical path of the imaging optical system 5 in the mode for generating a three-dimensional super-resolution image. In a state where the optical member 52 is inserted into the optical path of the imaging optical system 5, the fluorescent light image from the fluorescent material becomes more circular as the fluorescent material approaches a focus position of the imaging optical system 5, and has a higher flatness ratio (ellipticity) as the fluorescent material is distanced from the focus position of the imaging optical system 5. The directions of a major axis and a minor axis of the ellipse invert between a case where the fluorescent material is present on a front focus side of the focus position of the imaging optical system 5 and a case where the fluorescent material is present on a rear focus side, an amount of skew and the orientation of the skew relative to the focus position can be found from the flatness ratio and the orientations of the major axis and the minor axis of the ellipse. The microscope apparatus 1 can, using a relationship between the flatness ratio and the amount of skew relative to the focus position obtained in advance through calibration or the like, calculate the position of the fluorescent material in an optical axis direction of the imaging optical system 5, for example.

Note that the same applies to the case where an image of light from a fiducial marker (for example, fluorescent light) is captured as described in the fourth embodiment and fifth embodiment, and displacement of the sample X in the optical axis direction of the imaging optical system 5 can be calculated from the flatness ratio and the orientations of the major axis and the minor axis of the ellipse in that image. The image processing unit 7 can also carry out correction using the displacement of the sample X in the optical axis direction of the imaging optical system 5.

Note that a case where an image generation period and an interrupt period are provided, as described in the first embodiment and second embodiment, can be combined with a case where an image of light from a fiducial marker (for example, fluorescent light) is captured, as described in the fourth embodiment and fifth embodiment. In this case, when, for example, linearly interpolating the amount of displacement of the fiducial marker, the correction amount may be calculated using the timing of the captured image captured in the image generation period.

In the above-described embodiments, the control device 8 includes a computer system, for example. The control device 8 reads out a control program stored in the storage device 43 and executes various types of processes in accordance with that control program. This control program, for example, causes a computer to execute control of a microscope apparatus that emits activating light that activates a fluorescent material contained in a sample and exciting light that excites the activated fluorescent material, captures an image of fluorescent light from the fluorescent material, and carries out image processing using a result of the image capturing, the control including: providing a plurality of image generation periods and interrupt periods; causing, in the image generation period, the activated fluorescent material to be irradiated with the exciting light and causing the image of the fluorescent light from the activated fluorescent material to be captured in a plurality of frame periods; and setting an intensity of the exciting light in the interrupt period to be lower than an intensity in the image generation period or causing the emission of the exciting light to stop in the interrupt period, and the image processing including generating one picture image using at least some of image capturing results obtained in the plurality of frame periods. This program may be recorded onto a computer-readable storage medium and provided in such a state.

Note that the technical scope of the present invention is not intended to be limited to the aspects described in the foregoing embodiments. One or more of the requirements described in the foregoing embodiments may be omitted. Additionally, the requirements described in the foregoing embodiments can be combined as appropriate. Moreover, to the extent permissible by law, all documents cited in the embodiments described above are incorporated herein by reference.

DESCRIPTION OF REFERENCE SIGNS

1 Microscope apparatus
4 Illumination optical system
5 Imaging optical system
6 Image capturing unit
7 Image processing unit
42 Controller
X Sample

The invention claimed is:

1. A microscope apparatus comprising:
a first illumination optical system configured to emit activating light for activating a fluorescent material contained in a sample;
a second illumination optical system configured to emit exciting light for exciting the activated fluorescent material;
an imaging optical system configured to form an image of fluorescent light from the fluorescent material;
an image capturing unit configured to capture the image formed by the imaging optical system;
an image processing unit configured to carry out image processing using one or more images captured by the image capturing unit;
a controller; and
a display unit, wherein:
the controller is configured to:
  (i) in a first period, cause the activated fluorescent material to be irradiated with the exciting light and cause the image capturing unit to capture the image of the fluorescent light from the activated fluorescent material a plurality of times; and
  (ii) in a second period, reduce an intensity of the exciting light or cause the emission of the exciting light to stop, such that
  in response to a first user instruction, the controller is configured to repeat a sequence of (i) and (ii) in which a first execution of (ii) interposes between a first execution of (i) and a second execution of (i) in the sequence, and
  in response to a second user instruction, the controller is configured to repeat (i) without executing (ii) between repetitions of (i); and
the controller is configured to cause the image processing unit to generate a plurality of super-resolution images, each super-resolution image being generated from two or more images captured in one execution of (i) such that consecutive reproduction of the plurality of super-resolution images generated from respective repetitions of (i) creates a moving picture of contents of the sample.

2. The apparatus according to claim 1, wherein at least a part is shared by the first illumination optical system and the second illumination optical system.

3. The apparatus according to claim 1, wherein the controller is configured to alternately perform (i) and (ii) such that the first execution of (ii) immediately follows the first execution of (i), and the second execution of (i) immediately follows the first execution of (ii), in the sequence repeated in response to the first user instruction.

4. The apparatus according to claim 1, wherein a shortest length of time to perform any of the plurality of repetitions of (ii) is longer than a longest length of time taken to perform capturing the image in any of the plurality of repetitions of (i).

5. The apparatus according to claim 1,
wherein a shortest length of time taken to perform any of the repetitions of (ii) is longer than a longest length of time taken to perform any of the repetitions of (i).

6. The apparatus according to claim 1, wherein
(i) comprises the controller being configured to:
  (i.1) cause exciting light of a first wavelength to be emitted and cause the image capturing unit to capture the image of the fluorescent light from the activated fluorescent material a p number of times; and
  (i.2) cause exciting light of a second wavelength to be emitted and cause the image capturing unit to capture the image of the fluorescent light from the activated fluorescent material a q number of times, and
  the controller is configured to cause the image processing unit to generate at least one super-resolution image from two or more images captured in (i.1) and (i.2).

7. The apparatus according to claim 6, wherein the image processing unit is configured to generate one super-resolution image from the images captured in (i.1) and (i.2).

8. The apparatus according to claim 6, wherein the image processing unit is configured to generate a first super-resolution image from two or more images captured in (i.1) and to generate a second super-resolution image from two or more images captured in (i.2).

9. The apparatus according to claim 8, wherein the image processing unit is configured to generate one super-resolution image from the first super-resolution image and the second super-resolution image.

10. The apparatus according to claim 6, wherein the controller is configured to execute, a plurality of times, a process in which the illumination optical system emits auxiliary light for detecting a position of a fiducial marker and the image capturing unit captures an image of light from the fiducial marker.

11. The apparatus according to claim 10, wherein an optical intensity of the auxiliary light is lower than an optical intensity of the exciting light.

12. The apparatus according to claim 10, wherein the image processing unit is configured to correct at least one of the images captured in (i.1) and correct at least one of the images captured in (i.2) based on a movement of the fiducial marker.

13. The apparatus according to claim 10, wherein the image processing unit is configured to correct a positional relationship between at least one of the images captured in (i.1) and at least one of the images captured in (i.2) based on a movement of the fiducial marker.

14. The apparatus according to claim 6, wherein
(i.1) further includes causing a first fluorescent material to be irradiated with the activating light while the fluorescent material is irradiated with the first exciting light during the first period;
(i.2) further includes causing a second fluorescent material to be irradiated with the activating light while the fluorescent material is irradiated with the second exciting light during the first period; and
the controller is configured to change an intensity of the activating light in the first period depending on the first fluorescent material and the second fluorescent material.

15. The apparatus according to claim 1, wherein
the apparatus further comprises a stage configured to hold the sample and to move the sample, and
(ii) further includes causing the stage to move the sample, in the second period, to a position different from a position of the sample during an immediately preceding execution of (i).

16. An observation method comprising:
emitting activating light that activates a fluorescent material contained in a sample;
emitting exciting light that excites the activated fluorescent material;
forming an image of fluorescent light from the fluorescent material;
capturing the image formed by an imaging optical system;
carrying out image processing using one or more captured images, wherein
capturing the image includes at least one of (i) and (ii):
  (i) in a first period, causing the activated fluorescent material to be irradiated with the exciting light and causing the image of the fluorescent light from the activated fluorescent material to be captured a plurality of times; and
  (ii) in a second period, reducing an intensity of the exciting light or causing the emission of the exciting light to stop, such that
  in response to a first user instruction, the capturing of the image comprises repeating a sequence of (i) and (ii) in which a first execution of (ii) interposes between a first execution of (i) and a second execution of (i) in the sequence, and
  in response to a second user instruction, the capturing of the image comprises repeating (i) without executing (ii) between repetitions of (i); and
the image processing comprises generating a plurality of super-resolution images, each super-resolution image being generated from two or more images captured in one execution of (i) such that consecutive reproduction of the plurality of super-resolution images generated from respective repetitions of (i) creates a moving picture of contents of the sample.

17. The method according to claim 16, wherein (ii) further includes causing the sample to be moved, in the second period, to a position different from a position of the sample during an immediately preceding execution of (i).

18. A non-transitory computer-readable medium storing a control program causing a computer to execute control of a microscope apparatus configured (i) to emit activating light that activates a fluorescent material contained in a sample and exciting light that excites the activated fluorescent material, (ii) to capture an image of fluorescent light from the fluorescent material, and (iii) to carry out image processing using one or more captured images,
the control comprising at least one of (i) and (ii):
  (i) in a first period, causing the activated fluorescent material to be irradiated with the exciting light and causing the image of the fluorescent light from the activated fluorescent material to be captured a plurality of times; and
  (ii) in a second period, reducing an intensity of the exciting light or causing the emission of the exciting light to stop, such that
  in response to a first user instruction, the control comprising repeating a sequence of (i) and (ii) in which a first execution of (ii) interposes between a first execution of (i) and a second execution of (i) in the sequence, and in response to a second user instruction, the control comprising repeating (i) without executing (ii) between repetitions of (i); and the image processing comprising generating a plurality of super-resolution images, each super-resolution image being generated from two or more images captured in one execution of (i) such that consecutive reproduction of the plurality of super-resolution images generated from respective repetitions of (i) creates a moving picture of contents of the sample.

19. The non-transitory computer-readable medium according to claim 18, wherein (ii) further includes causing the sample to be moved, in the second period, to a position different from a position of the sample during an immediately preceding execution of (i).

\* \* \* \* \*